(12) United States Patent
Zhang et al.

(10) Patent No.: US 9,940,020 B2
(45) Date of Patent: Apr. 10, 2018

(54) MEMORY MANAGEMENT METHOD, APPARATUS, AND SYSTEM

(71) Applicant: Huawei Technologies Co., Ltd., Shenzhen (CN)

(72) Inventors: Lixin Zhang, Beijing (CN); Rui Hou, Beijing (CN); Ke Zhang, Beijing (CN); Tao Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 14/942,719

(22) Filed: Nov. 16, 2015

(65) Prior Publication Data
US 2016/0070475 A1 Mar. 10, 2016

Related U.S. Application Data

(63) Continuation of application No. PCT/CN2013/088073, filed on Nov. 28, 2013.

(30) Foreign Application Priority Data

May 17, 2013 (CN) .......................... 2013 1 0183167

(51) Int. Cl.
*G06F 12/02* (2006.01)
*G06F 3/06* (2006.01)
(Continued)

(52) U.S. Cl.
CPC ............ *G06F 3/0604* (2013.01); *G06F 3/067* (2013.01); *G06F 3/0629* (2013.01);
(Continued)

(58) Field of Classification Search
None
See application file for complete search history.

(56) References Cited

U.S. PATENT DOCUMENTS 6,055,617 A * 4/2000 Kingsbury .............. G06F 12/10
711/165
6,249,802 B1 6/2001 Richardson et al.
(Continued)

FOREIGN PATENT DOCUMENTS

| CN | 101373445 A | 2/2009 |
|---|---|---|
| CN | 101470665 A | 7/2009 |
| WO | 2013/052068 A1 | 4/2013 |

OTHER PUBLICATIONS

Pan, "Principles of a Microcomputer," Sep. 2003, 5 pages.

*Primary Examiner* — Kaushikkumar Patel
(74) *Attorney, Agent, or Firm* — Huawei Technologies Co., Ltd.

(57) ABSTRACT

A memory management method implemented by a requesting node includes sending first indication information used for indicating a length of memory required by the requesting node and receiving second indication information used for indicating first remote memory provided to the requesting node by a target contributing node in at least one contributing node that can provide remote memory. The method also includes determining, from available virtual addresses, a first virtual address corresponding to the first remote memory, and sending a first data read/write instruction for the first data when first data whose pointer is within a range of the first virtual address needs to be read/written, where the first data read/write instruction includes third indication information, and the third indication information is used for indicating storage space, for storing the first data, in the first remote memory.

9 Claims, 6 Drawing Sheets

(51) Int. Cl.
*G06F 12/08* (2016.01)
*G06F 9/50* (2006.01)

(52) U.S. Cl.
CPC ............ *G06F 9/5016* (2013.01); *G06F 12/02* (2013.01); *G06F 12/08* (2013.01)

(56) References Cited

U.S. PATENT DOCUMENTS

| | | | |
|---|---|---|---|
| 2006/0143350 A1* | 6/2006 | Miloushev | G06F 9/5016 710/242 |
| 2008/0040561 A1 | 2/2008 | Bryant et al. | |
| 2009/0077326 A1* | 3/2009 | Motohashi | G06F 12/0692 711/153 |
| 2013/0290546 A1* | 10/2013 | Samih | G06F 13/14 709/226 |
| 2014/0280669 A1* | 9/2014 | Harper, III | G06F 15/167 709/213 |
| 2014/0359044 A1* | 12/2014 | Davis | H04L 45/60 709/213 |
| 2015/0370721 A1* | 12/2015 | Morris | G06F 12/0284 711/202 |

* cited by examiner

100

A request node in a memory management system sends first indication information, where the first indication information is used for indicating a length of memory required by the request node — S110

The request node receives second indication information, where the second indication information is used for indicating first remote memory provided to the request node by a target contributing node in at least one contributing node that can provide remote memory, the first remote memory is determined according to the first indication information, and a length of the first remote memory is greater than or equal to the length of the memory required by the request node — S120

The request node determines, from available virtual addresses, a first virtual address corresponding to the first remote memory — S130

When first data whose pointer is within a range of the first virtual address needs to be read/written, the request node sends a first data read/write instruction for the first data, where the first data read/write instruction includes third indication information, and the third indication information is used for indicating storage space, for storing the first data, in the first remote memory, so that the target contributing node accesses the first data according to the third indication information — S140

A contributing node in a memory management system determines first remote memory, where the first remote memory is determined according to first indication information from a requesting node, the first indication information is used for indicating a length of memory required by the requesting node, and a length of the first remote memory is greater than or equal to the length of the memory required by the requesting node  — S210

The contributing node receives a first data read/write instruction for first data sent by the requesting node, where the first data read/write instruction is used for instructing the contributing node to access the first data, the first data read/write instruction includes third indication information, and the third indication information is used for indicating storage space, for storing the first data, in the first remote memory  — S220

The contributing node accesses the first data according to the first data read/write instruction and the third indication information  — S230

FIG. 2

MEMORY MANAGEMENT METHOD, APPARATUS, AND SYSTEM

This application is a continuation of International Application No. PCT/CN2013/088073, filed on Nov. 28, 2013, which claims priority to Chinese Patent Application No. 201310183167.1 filed on May 17, 2013, both of which are hereby incorporated by reference in their entireties.

TECHNICAL FIELD

The present invention relates to the field of computers, and more specifically, to a memory management method, apparatus, and system.

BACKGROUND

At present, according to different scales, a resource management server system generally includes tens, hundreds or even tens of thousands of computer server nodes. Most of these server nodes are commercially available servers up to commercial standards, and have independent hardware devices such as memory.

With the increasing popularity and growing acceptance of a cloud computing model, a server node needs to serve cloud computing, and therefore, application loads become increasingly varied. Compared with conventional loads such as transaction processing and network services, newly emerged workloads are all data-centric. These new input/output (IO)-intensive loads are run on a large-scale cluster (including hundreds or thousands of servers), and varied (structured, unstructured, and multimedia) data is processed.

Therefore, a method that can enable server nodes to share memory resources easily is needed.

SUMMARY

Embodiments provide a memory management method, apparatus, and system, which can easily implement sharing of a memory resource.

A first aspect provides a memory management method. The method includes sending, by a requesting node in a memory management system, first indication information, where the first indication information is used for indicating a length of memory required by the requesting node. The method also includes receiving second indication information, where the second indication information is used for indicating first remote memory provided to the requesting node by a target contributing node in at least one contributing node that can provide remote memory, the first remote memory is determined according to the first indication information, and a length of the first remote memory is greater than or equal to the length of the memory required by the requesting node; determining, from available virtual addresses, a first virtual address corresponding to the first remote memory. When first data whose pointer is within a range of the first virtual address needs to be read/written, the method includes sending a first data read/write instruction for the first data, where the first data read/write instruction includes third indication information, and the third indication information is used for indicating storage space, for storing the first data, in the first remote memory, so that the target contributing node accesses the first data according to the third indication information.

In a first possible implementation manner, the sending, by a requesting node in a memory management system, first indication information includes: acquiring, by the requesting node in the memory management system, contributing node information for indicating the target contributing node; and sending the first indication information to the target contributing node according to the contributing node information; and the receiving second indication information includes: receiving the second indication information sent by the target contributing node.

With reference to the first aspect and the first possible implementation manner, in a second possible implementation manner, the sending the first indication information to the target contributing node according to the contributing node information includes sending a second data write instruction for second data to the target contributing node according to the contributing node information, where the second data write instruction includes the first indication information. The receiving the second indication information sent by the target contributing node includes receiving a second data write response that is sent by the target contributing node and is used for indicating that storage of the second data is completed, where the second data write response includes the second indication information.

With reference to the first aspect, the first possible implementation manner, and the second possible implementation manner, in a third possible implementation manner, the sending, by a requesting node in a memory management system, first indication information includes sending, by the requesting node in the memory management system, the first indication information to a control center, so that the control center determines the target contributing node from the contributing node and the first remote memory according to the first indication information and a length of the remote memory that can be provided by the contributing node. The length of the remote memory that can be provided by the contributing node is determined by the control center according to fourth indication information that is sent by the contributing node and is used for indicating the length of the remote memory that can be provided by the contributing node. The receiving second indication information includes: receiving the second indication information sent by the control center.

With reference to the first aspect, the first possible implementation manner, the second possible implementation manner, and the third possible implementation manner, in a fourth possible implementation manner, the method further includes receiving contributing node information that is sent by the control center and is used for indicating the target contributing node. The sending a first data read/write instruction for the first data includes sending the first data read/write instruction for the first data to the target contributing node according to the contributing node information.

With reference to the first aspect, the first possible implementation manner, the second possible implementation manner, the third possible implementation manner, and the fourth possible implementation manner, in a fifth possible implementation manner, the sending a first data read/write instruction for the first data includes broadcasting the first data read/write instruction for the first data, so that the contributing node accesses the first data after determining that the storage space is within a range of the remote memory that can be provided by the contributing node.

With reference to the first aspect, the first possible implementation manner, the second possible implementation manner, the third possible implementation manner, the fourth possible implementation manner, and the fifth possible implementation manner, in a sixth possible implementation manner, the memory management system includes at least two contributing nodes, and physical addresses of the remote memory that can be provided by the at least two contributing nodes are different.

With reference to the first aspect, the first possible implementation manner, the second possible implementation manner, the third possible implementation manner, the fourth possible implementation manner, the fifth possible implementation manner, and the sixth possible implementation manner, in a seventh possible implementation manner, the determining a first virtual address corresponding to the first remote memory includes: determining, from local memory within the requesting node, first local memory corresponding to the first remote memory, and determining the first virtual address according to the first local memory.

With reference to the first aspect, the first possible implementation manner, the second possible implementation manner, the third possible implementation manner, the fourth possible implementation manner, the fifth possible implementation manner, the sixth possible implementation manner, and the seventh possible implementation manner, in an eighth possible implementation manner, the length of the first remote memory is the same as the length of the memory required by the requesting node, and the second indication information is used for indicating a start physical address of the first remote memory; and the length of the first remote memory is the same as a length of the first data, and the third indication information is used for indicating a start physical address of the storage space.

With reference to the first aspect, the first possible implementation manner, the second possible implementation manner, the third possible implementation manner, the fourth possible implementation manner, the fifth possible implementation manner, the sixth possible implementation manner, the seventh possible implementation manner, and the eighth possible implementation manner, in a ninth possible implementation manner, the second indication information is used for indicating a start physical address and the length of the first remote memory; when a length of the first data is the same as the length, of the first remote memory, indicated by the second indication information, the third indication information is used for indicating the start physical address of the first remote memory; or when a length of the first data is less than the length, of the first remote memory, indicated by the second indication information, the third indication information is used for indicating a start physical address and a length of the storage space.

A second aspect provides a memory management method. The method includes determining, by a contributing node in a memory management system, first remote memory, where the first remote memory is determined according to first indication information from a requesting node, the first indication information is used for indicating a length of memory required by the requesting node, and a length of the first remote memory is greater than or equal to the length of the memory required by the requesting node. The method also includes receiving a first data read/write instruction for first data sent by the requesting node, where the first data read/write instruction is used for instructing the contributing node to access the first data, the first data read/write instruction includes third indication information, and the third indication information is used for indicating storage space, for storing the first data, in the first remote memory. The method also includes accessing the first data according to the first data read/write instruction and the third indication information.

In a possible implementation manner, the determining, by a contributing node in a memory management system, first remote memory includes: receiving, by the contributing node in the memory management system, the first indication information sent by the requesting node; and determining the first remote memory according to the first indication information; and the method further include: sending, to the requesting node, second indication information for indicating the first remote memory.

With reference to the second aspect and the first possible implementation manner, in a second possible implementation manner, the receiving, by the contributing node in the memory management system, the first indication information sent by the requesting node includes: receiving, by the contributing node in the memory management system, a second data write instruction for second data sent by the requesting node and the second data, where the second data write instruction includes the first indication information; and determining the first remote memory according to the first indication information, and storing the first data in the first remote memory; and the sending, to the requesting node, second indication information for indicating the first remote memory include: sending, to the requesting node, a second data write response for indicating that storage of the second data is completed, where the second data write response includes the second indication information for indicating the first remote memory.

With reference to the second aspect, the first possible implementation manner, and the second possible implementation manner, in a third possible implementation manner, the determining, by a contributing node in a memory management system, first remote memory includes: sending, by the contributing node in the memory management system, fourth indication information to a control center, where the fourth indication information is used for indicating a start physical address and a length of remote memory that can be provided by the contributing node; receiving second indication information sent by the control center, where the second indication information is determined by the control center according to the first indication information and the fourth indication information; and determining the first remote memory according to the second indication information.

With reference to the second aspect, the first possible implementation manner, the second possible implementation manner, and the third possible implementation manner, in a fourth possible implementation manner, the accessing the first data according to the first data read/write instruction and the third indication information includes: determining that the storage space is within a range of the first remote memory; and accessing the first data in the storage space according to the first data read/write instruction.

With reference to the second aspect, the first possible implementation manner, the second possible implementation manner, the third possible implementation manner, and the fourth possible implementation manner, in a fifth possible implementation manner, the length of the memory required by the requesting node is the same as a length of the first data, a length of remote memory that can be provided by a target contributing node is the same as the length of the memory required by the requesting node, and the second indication information and the third indication information are used for indicating a start physical address of the first remote memory.

With reference to the second aspect, the first possible implementation manner, the second possible implementation manner, the third possible implementation manner, the fourth possible implementation manner, and the fifth possible implementation manner, in a sixth possible implementation manner, the second indication information is used for indicating a start physical address and the length of the first remote memory. When a length of the first data is the same as the length, of the first remote memory, indicated by the second indication information, the third indication information is used for indicating the start physical address of the first remote memory. When a length of the first data is less than the length, of the first remote memory, indicated by the second indication information, the third indication information is used for indicating a start physical address and a length of the storage space.

With reference to the second aspect, the first possible implementation manner, the second possible implementation manner, the third possible implementation manner, the fourth possible implementation manner, the fifth possible implementation manner, and the sixth possible implementation manner, in a seventh possible implementation manner, the method further includes: acquiring requesting node information for indicating the requesting node; determining the requesting node according to the requesting node information; and forbidding a node other than the requesting node to use the first remote memory.

A third aspect provides a memory management method. The method includes determining, by a control center in a memory management system, a start physical address and a length of remote memory that can be provided by at least one contributing node, and receiving first indication information sent by a requesting node, where the first indication information is used for indicating a length of memory required by the requesting node. The method includes determining, from the contributing node according to the first indication information and the start physical address and the length of the remote memory that can be provided by the at least one contributing node, a target contributing node and first remote memory provided by the target contributing node to the requesting node, where a length of the first remote memory is greater than or equal to the length of the memory required by the requesting node. The method includes sending, to the requesting node and the target contributing node, second indication information for indicating the first remote memory, so that the requesting node and the target contributing node determine the first remote memory according to the second indication information, and access first data in the first remote memory, where a pointer of the first data is within a range of a first virtual address allocated by the requesting node to the first remote memory.

In a possible implementation manner, the method further includes sending, to the requesting node, contributing node information for indicating the target contributing node, so that the requesting node sends a first data read/write instruction for the first data to the target contributing node according to the contributing node information.

With reference to the third aspect and the first possible implementation manner, in a second possible implementation manner, the method further includes sending, to the contributing node, requesting node information for indicating the requesting node, so that the target contributing node determines the requesting node according to the requesting node information and forbids a node other than the requesting node to use the first remote memory.

With reference to the third aspect, the first possible implementation manner, and the second possible implementation manner, in a third possible implementation manner, the memory management system includes at least two contributing nodes, and the determining, from the contributing node according to the first indication information and the fourth indication information, a target contributing node and first remote memory provided by the target contributing node to the requesting node includes determining, from the contributing node according to the first indication information and the fourth indication information, the target contributing node and the first remote memory provided by the target contributing node to the requesting node, so that physical addresses of the remote memory that is provided by the contributing nodes and includes the first remote memory are different.

With reference to the third aspect, the first possible implementation manner, the second possible implementation manner, and the third possible implementation manner, in a fourth possible implementation manner, the length of the memory required by the requesting node is the same as a length of the first data, the length of the remote memory that can be provided by the target contributing node is the same as the length of the memory required by the requesting node, and the second indication information and third indication information are used for indicating a start physical address of the first remote memory.

With reference to the third aspect, the first possible implementation manner, the second possible implementation manner, the third possible implementation manner, and the fourth possible implementation manner, in a fifth possible implementation manner, the second indication information is used for indicating a start physical address and the length of the first remote memory; when a length of the first data is the same as the length, of the first remote memory, indicated by the second indication information, third indication information is used for indicating the start physical address of the first remote memory; or when a length of the first data is less than the length, of the first remote memory, indicated by the second indication information, the third indication information is used for indicating a start physical address and a length of storage space for storing the first data.

A fourth aspect provides a memory management apparatus, the apparatus including a sending unit, configured to enable a requesting node in a memory management system to send first indication information, where the first indication information is used for indicating a length of memory required by the requesting node. The apparatus also includes a receiving unit, configured to receive the second indication information which is used for indicating first remote memory provided to the requesting node by a target contributing node in at least one contributing node that can provide remote memory, the first remote memory is determined according to the first indication information, and a length of the first remote memory is greater than or equal to the length of the memory required by the requesting node. The apparatus also includes a processing unit, configured to determine, from available virtual addresses, a first virtual address corresponding to the first remote memory; and configured to: when first data whose pointer is within a range of the first virtual address needs to be read/written, control the sending unit to send a first data read/write instruction for the first data, where the first data read/write instruction includes third indication information, and the third indication information is used for indicating storage space, for storing the first data, in the first remote memory, so that the target contributing node accesses the first data according to the third indication information.

In a possible implementation manner, the processing unit is specifically configured to acquire contributing node information for indicating the target contributing node; the sending unit is specifically configured to send the first indication information to the target contributing node according to the contributing node information; and the receiving unit is specifically configured to receive the second indication information sent by the target contributing node.

With reference to the fourth aspect and the first possible implementation manner, in a second possible implementation manner, the sending unit is specifically configured to send a second data write instruction for second data to the target contributing node according to the contributing node information, where the second data write instruction includes the first indication information; and the receiving unit is specifically configured to receive a second data write response that is sent by the target contributing node and is used for indicating that storage of the second data is completed, where the second data write response includes the second indication information.

With reference to the fourth aspect, the first possible implementation manner, and the second possible implementation manner, in a third possible implementation manner, the sending unit is specifically configured to send the first indication information to a control center, so that the control center determines the target contributing node from the contributing node and the first remote memory from the contributing node according to the first indication information and a length of the remote memory that can be provided by the contributing node, where the length of the remote memory that can be provided by the contributing node is determined by the control center according to fourth indication information that is sent by the contributing node and is used for indicating the length of the remote memory that can be provided by the contributing node; and the receiving unit is specifically configured to receive the second indication information sent by the control center.

With reference to the fourth aspect, the first possible implementation manner, the second possible implementation manner, and the third possible implementation manner, in a fourth possible implementation manner, the receiving unit is further configured to receive contributing node information that is sent by the control center and is used for indicating the target contributing node, and the sending unit is specifically configured to send the first data read/write instruction for the first data to the target contributing node according to the contributing node information.

With reference to the fourth aspect, the first possible implementation manner, the second possible implementation manner, the third possible implementation manner, and the fourth possible implementation manner, in a fifth possible implementation manner, the sending unit is specifically configured to broadcast the first data read/write instruction for the first data, so that the contributing node accesses the first data after determining that the storage space is within a range of the remote memory that can be provided by the contributing node.

With reference to the fourth aspect, the first possible implementation manner, the second possible implementation manner, the third possible implementation manner, the fourth possible implementation manner, and the fifth possible implementation manner, in a sixth possible implementation manner, the memory management system includes at least two contributing nodes, and physical addresses of the remote memory that can be provided by the at least two contributing nodes are different.

With reference to the fourth aspect, the first possible implementation manner, the second possible implementation manner, the third possible implementation manner, the fourth possible implementation manner, the fifth possible implementation manner, and the sixth possible implementation manner, in a seventh possible implementation manner, the processing unit is specifically configured to determine, from local memory within the requesting node, first local memory corresponding to the first remote memory; and configured to determine the first virtual address according to the first local memory.

With reference to the fourth aspect, the first possible implementation manner, the second possible implementation manner, the third possible implementation manner, the fourth possible implementation manner, the fifth possible implementation manner, the sixth possible implementation manner, and the seventh possible implementation manner, in an eighth possible implementation manner, the length of the first remote memory is the same as the length of the memory required by the requesting node, and the second indication information is used for indicating a start physical address of the first remote memory; and the length of the first remote memory is the same as a length of the first data, and the third indication information is used for indicating a start physical address of the storage space.

With reference to the fourth aspect, the first possible implementation manner, the second possible implementation manner, the third possible implementation manner, the fourth possible implementation manner, the fifth possible implementation manner, the sixth possible implementation manner, the seventh possible implementation manner, and the eighth possible implementation manner, in a ninth possible implementation manner, the second indication information is used for indicating a start physical address and the length of the first remote memory; when a length of the first data is the same as the length, of the first remote memory, indicated by the second indication information, the third indication information is used for indicating the start physical address of the first remote memory; or when a length of the first data is less than the length, of the first remote memory, indicated by the second indication information, the third indication information is used for indicating a start physical address and a length of the storage space.

A fifth aspect provides a memory management apparatus. The apparatus includes a processing unit, configured to enable a contributing node in a memory management system to determine first remote memory, where the first remote memory is determined according to first indication information from a requesting node, the first indication information is used for indicating a length of memory required by the requesting node, and a length of the first remote memory is greater than or equal to the length of the memory required by the requesting node; and a receiving unit, configured to receive a first data read/write instruction for first data sent by the requesting node, where the first data read/write instruction is used for instructing the contributing node to access the first data, the first data read/write instruction includes third indication information, and the third indication information is used for indicating storage space, for storing the first data, in the first remote memory; where the processing unit is further configured to access the first data according to the first data read/write instruction and the third indication information.

In a possible implementation manner, the receiving unit is specifically configured to receive the first indication information sent by the requesting node; the processing unit is specifically configured to determine the first remote memory according to the first indication information; and the apparatus further includes: a sending unit, configured to send, to the requesting node, second indication information for indicating the first remote memory.

With reference to the fifth aspect and the first possible implementation manner, in a second possible implementation manner, the receiving unit is specifically configured to receive a second data write instruction for second data sent by the requesting node and the second data, where the second data write instruction includes the first indication information; the processing unit is specifically configured to determine the first remote memory according to the first indication information, and store the first data in the first remote memory; and the sending unit is specifically configured to send, to the requesting node, a second data write response for indicating that storage of the second data is completed, where the second data write response includes the second indication information for indicating the first remote memory.

With reference to the fifth aspect, the first possible implementation manner, and the second possible implementation manner, in a third possible implementation manner, the apparatus further includes: a sending unit, configured to send fourth indication information to a control center, where the fourth indication information is used for indicating a start physical address and a length of remote memory that can be provided by the contributing node; where the receiving unit is specifically configured to receive second indication information sent by the control center, where the second indication information is determined by the control center according to the first indication information and the fourth indication information; and the processing unit is specifically configured to determine the first remote memory according to the second indication information.

With reference to the fifth aspect, the first possible implementation manner, the second possible implementation manner, and the third possible implementation manner, in a fourth possible implementation manner, the processing unit is specifically configured to determine that the storage space is within a range of the first remote memory; and configured to access the first data in the storage space according to the first data read/write instruction.

With reference to the fifth aspect, the first possible implementation manner, the second possible implementation manner, the third possible implementation manner, and the fourth possible implementation manner, in a fifth possible implementation manner, the length of the memory required by the requesting node is the same as a length of the first data, a length of remote memory that can be provided by a target contributing node is the same as the length of the memory required by the requesting node, and the second indication information and the third indication information are used for indicating a start physical address of the first remote memory.

With reference to the fifth aspect, the first possible implementation manner, the second possible implementation manner, the third possible implementation manner, the fourth possible implementation manner, and the fifth possible implementation manner, in a sixth possible implementation manner, the second indication information is used for indicating a start physical address and the length of the first remote memory; when a length of the first data is the same as the length, of the first remote memory, indicated by the second indication information, the third indication information is used for indicating the start physical address of the first remote memory; or when a length of the first data is less than the length, of the first remote memory, indicated by the second indication information, the third indication information is used for indicating a start physical address and a length of the storage space.

With reference to the fifth aspect, the first possible implementation manner, the second possible implementation manner, the third possible implementation manner, the fourth possible implementation manner, the fifth possible implementation manner, and the sixth possible implementation manner, in a seventh possible implementation manner, the processing unit is further configured to acquire requesting node information for indicating the requesting node; configured to determine the requesting node according to the requesting node information; and configured to forbid a node other than the requesting node to use the first remote memory.

A sixth aspect provides a memory management apparatus. The apparatus includes a processing unit, configured to enable a control center in a memory management system to determine a start physical address and a length of remote memory that can be provided by at least one contributing node; a receiving unit, configured to receive first indication information sent by a requesting node, where the first indication information is used for indicating a length of memory required by the requesting node; where the processing unit is further configured to determine, from the contributing node according to the first indication information and the start physical address and the length of the remote memory that can be provided by the at least one contributing node, a target contributing node and first remote memory provided by the target contributing node to the requesting node, where a length of the first remote memory is greater than or equal to the length of the memory required by the requesting node; and a sending unit, configured to send, to the requesting node and the target contributing node, second indication information for indicating the first remote memory, so that the requesting node and the target contributing node determine the first remote memory according to the second indication information, and access first data in the first remote memory, where a pointer of the first data is within a range of a first virtual address allocated by the requesting node to the first remote memory.

In a possible implementation manner, the sending unit is further configured to send, to the requesting node, contributing node information for indicating the target contributing node, so that the requesting node sends a first data read/write instruction for the first data to the target contributing node according to the contributing node information.

With reference to the sixth aspect and the first possible implementation manner, in a second possible implementation manner, the sending unit is further configured to send, to the contributing node, requesting node information for indicating the requesting node, so that the target contributing node determines the requesting node according to the requesting node information and forbids a node other than the requesting node to use the first remote memory.

With reference to the sixth aspect, the first possible implementation manner, and the second possible implementation manner, in a third possible implementation manner, the memory management system includes at least two contributing nodes, and the determining, from the contributing node according to the first indication information and the fourth indication information, a target contributing node and first remote memory provided by the target contributing node to the requesting node includes: determining, from the contributing nodes according to the first indication information and the fourth indication information, the target contributing node and the first remote memory provided by the target contributing node to the requesting node, so that physical addresses of the remote memory that is provided by the contributing nodes and includes the first remote memory are different.

With reference to the sixth aspect, the first possible implementation manner, the second possible implementation manner, and the third possible implementation manner, in a fourth possible implementation manner, the length of the memory required by the requesting node is the same as a length of the first data, the length of the remote memory that can be provided by the target contributing node is the same as the length of the memory required by the requesting node, and the second indication information and third indication information are used for indicating a start physical address of the first remote memory.

With reference to the sixth aspect, the first possible implementation manner, the second possible implementation manner, the third possible implementation manner, and the fourth possible implementation manner, in a fifth possible implementation manner, the second indication information is used for indicating a start physical address and the length of the first remote memory; when a length of the first data is the same as the length, of the first remote memory, indicated by the second indication information, third indication information is used for indicating the start physical address of the first remote memory; or when a length of the first data is less than the length, of the first remote memory, indicated by the second indication information, the third indication information is used for indicating a start physical address and a length of storage space for storing the first data.

A seventh aspect provides a memory management system. The system includes at least one requesting node, configured to send first indication information, where the first indication information is used for indicating a length of memory required by the requesting node, receive second indication information, where the second indication information is used for indicating first remote memory provided to the requesting node by a target contributing node in at least one contributing node that can provide remote memory, the first remote memory is determined according to the first indication information, and a length of the first remote memory is greater than or equal to the length of the memory required by the requesting node, determine, from available virtual addresses, a first virtual address corresponding to the first remote memory, and when first data whose pointer is within a range of the first virtual address needs to be read/written, send a first data read/write instruction for the first data, where the first data read/write instruction includes third indication information, and the third indication information is used for indicating storage space, for storing the first data, in the first remote memory, so that the target contributing node accesses the first data according to the third indication information; and the at least one contributing node, configured to determine the first remote memory, where the first remote memory is determined according to the first indication information from the requesting node, the first indication information is used for indicating the length of the memory required by the requesting node, and the length of the first remote memory is greater than or equal to the length of the memory required by the requesting node, receive the first data read/write instruction, for the first data, sent by the requesting node, where the first data read/write instruction is used for instructing the contributing node to access the first data, the first data read/write instruction includes the third indication information, and the third indication information is used for indicating the storage space, for storing the first data, in the first remote memory, and access the first data according to the first data read/write instruction and the third indication information.

In a possible implementation manner, the system further includes a control center, configured to determine a start physical address and a length of the remote memory that can be provided by the at least one contributing node; receive the first indication information sent by the requesting node, where the first indication information is used for indicating the length of the memory required by the requesting node; determine, from the contributing node according to the first indication information and the start physical address and the length of the remote memory that can be provided by the at least one contributing node, the target contributing node and the first remote memory provided by the target contributing node to the requesting node, where the length of the first remote memory is greater than or equal to the length of the memory required by the requesting node; and send, to the requesting node and the target contributing node, the second indication information for indicating the first remote memory, so that the requesting node and the target contributing node determine the first remote memory according to the second indication information, and access the first data in the first remote memory, where the pointer of the first data is within the range of the first virtual address allocated by the requesting node to the first remote memory.

For the memory management method, apparatus, and system according to the embodiments, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a memory management method according to an embodiment;

FIG. 2 is a schematic flowchart of a memory management method according to another embodiment;

DETAILED DESCRIPTION OF ILLUSTRATIVE EMBODIMENTS

Figure 3:
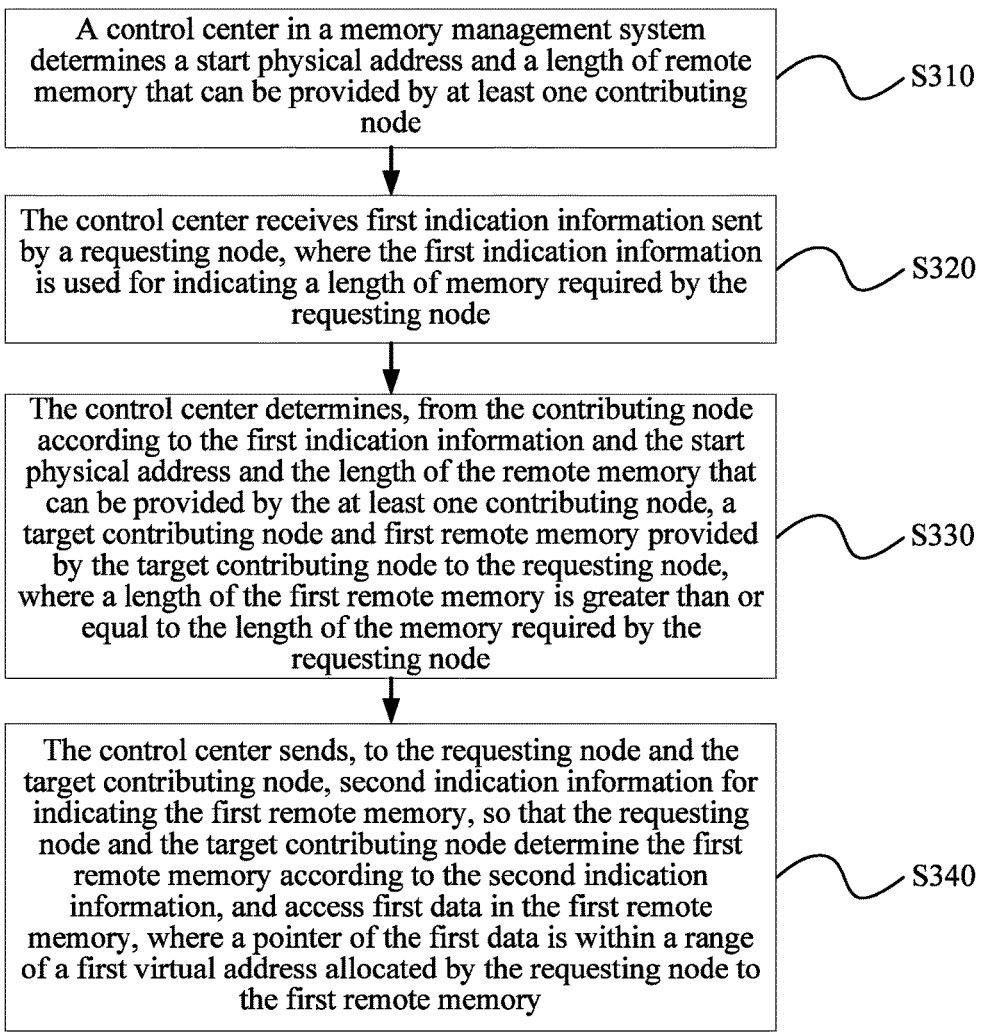
FIG. 3 is a schematic flowchart of a memory management method according to still another embodiment.

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technical solutions are applicable to a server system having more than two server nodes. The server nodes may have independent hardware structures, so that same services or different services can be independently implemented, and in addition, the server nodes can communicate with each other.

It should be noted that in embodiments, the server nodes all have particular memory space; however, sizes of memory of the server nodes may be same or different, which is not specifically limited in the present invention.

For ease of understanding, in the description below, in the more than two server nodes, a server node that has insufficient memory or the like and therefore requests use of memory of another server node is referred to as a requesting node, and a server node that can provide another server node with memory (which is referred to as remote memory below) is referred to as a contributing node. It should be noted that in the embodiments, a server node may be used as a requesting node within a period and used as a contributing node within another period, or a server node may be used as a contributing node for another server node and a requesting node at the same time.

FIG. 1 is a schematic flowchart of a memory management method 100 described from the perspective of a requesting node. As shown in FIG. 1, the method 100 includes the following steps.

S110: A requesting node in a memory management system sends first indication information, where the first indication information is used for indicating a length of memory required by the requesting node.

In this embodiment, a length of memory represents a capacity of memory; and the length of the memory required by the requesting node is a capacity of the memory required by the requesting node.

S120: The requesting node receives second indication information, where the second indication information is used for indicating first remote memory provided to the requesting node by a target contributing node in at least one contributing node that can provide remote memory, the first remote memory is determined according to the first indication information, and a length of the first remote memory is greater than or equal to the length of the memory required by the requesting node.

S130: The requesting node determines, from available virtual addresses, a first virtual address corresponding to the first remote memory.

S140: When first data whose pointer is within a range of the first virtual address needs to be read/written, the requesting node sends a first data read/write instruction for the first data, where the first data read/write instruction includes third indication information, and the third indication information is used for indicating storage space, for storing the first data, in the first remote memory, so that the target contributing node accesses the first data according to the third indication information.

Specifically, in S110, for example, when a requesting node has insufficient local memory or needs to use large-capacity memory provided by a contributing node to execute an application or process a service, the requesting node may send a request message to the outside. The request message may carry information (an example of the first indication information) for indicating the memory required by the requesting node. It should be understood that in this embodiment of the present invention, a capacity of the memory indicated by the first indication information may be greater than the capacity of the memory required by the requesting node, or may be equal to the capacity of the memory required by the requesting node, which is not specifically limited.

In this embodiment, a requesting node may know routing information (an example of contributing node information discussed later) of contributing nodes in the system, so that the foregoing request message may be directly sent to the contributing nodes (that is, Case 1), or, a control center discussed later may be disposed in the system to allocate remote memory in a unified manner provided by the contributing nodes in the system, and therefore, the requesting node may send the foregoing request message to the control center in the system (that is, Case 2). Case 1 and Case 2 are separately described below.

Case 1

Optionally, in this embodiment, the sending, by a requesting node in a memory management system, first indication information includes: acquiring, by the requesting node in the memory management system, contributing node information for indicating the target contributing node; and sending the first indication information to the target contributing node according to the contributing node information; and the receiving second indication information includes: receiving the second indication information sent by the target contributing node.

Moreover, optionally, the contributing node information includes an identifier of the contributing node in the memory management system or a position of the contributing node in the memory management system.

Specifically, in this embodiment, service nodes (including a contributing node and a requesting node) in the system may know routing information (an example of the contributing node information) of each other, and, the routing information may be a node identifier (Node ID) of the service node, or may be a position of the service node. For example, the contributing node may broadcast, in the system, information (for example, the information may indicate a size of the remote memory and routing information of the contributing node) for indicating remote memory that can be provided by the contributing node. The requesting node may determine, according to the information, the contributing node and the remote memory that can be provided by the contributing node. Therefore, in S110, the requesting node may send a request message to the contributing node in the system according to the routing information of the service nodes, where the request message may carry information (an example of the first indication information) for indicating the memory required by the requesting node.

Optionally, in this embodiment, the sending the first indication information to the target contributing node according to the contributing node information includes: sending a second data write instruction for second data to the target contributing node according to the contributing node information, where the second data write instruction includes the first indication information.

Specifically, in this embodiment, as discussed above, service nodes (including a contributing node and a requesting node) in the system may know routing information of the service nodes. Therefore, when a requesting node has insufficient local memory or needs to use large-capacity memory provided by a contributing node to execute an application or process a service, for example, when data (an example of the second data) of the application or the service needs to be written, the requesting node may send a data write instruction (an example of the second data write instruction) for the second data to another service node (including the contributing node) in the system according to the routing information of the service nodes. The second data write instruction may carry information (an example of the first indication information) for indicating the memory required by the requesting node. It should be understood that the length of the memory that is indicated by the first indication information and is required by the requesting node may be greater than or equal to a length of the second data, which is not specifically limited.

After receiving the request message, the service node may determine, according to the first indication information that may be carried in the request message and a capacity of memory that the service node can provide to external devices, whether the memory required by the requesting node can be provided to the requesting node.

For example, if the capacity of the memory that the service node can provide to the outside is greater than or equal to the memory that is provided to the requesting node and required by the requesting node, the service node may be used as a contributing node. Moreover, the contributing node may return a response message to the requesting node, where the response message may carry information (the second indication information) for indicating memory (the first remote memory) that can be provided by the service node. In S120, the requesting node may receive the second indication information sent by the contributing node. Therefore, the requesting node and the contributing node may both know that the requesting node obtains a permission to use the first remote memory in the contributing node. In this embodiment of the present invention, the requesting node may exclusively use the first remote memory, so that security of a service can be improved.

Optionally, the receiving the second indication information sent by the target contributing node includes receiving a second data write response that is sent by the target contributing node and is used for indicating that storage of the second data is completed, where the second data write response includes the second indication information.

Specifically, if the foregoing first indication information is carried in the second data write instruction, because the length of the memory that is indicated by the first indication information and is required by the requesting node is greater than or equal to the length of the second data, the contributing node may store the second data in a part of or all storage space of the first remote memory according to the second data write instruction. Therefore, the contributing node may add the second indication information to the second data write response that is sent to the requesting node and is used for indicating that storage of the second data is completed.

It should be understood that the foregoing listed first data and the second data may be same data or may be different data, which is not specifically limited.

Optionally, the length of the first remote memory is the same as the length of the memory required by the requesting node, and the second indication information is used for indicating a start physical address of the first remote memory.

Specifically, if a capacity of the memory provided by the contributing node is the same as the capacity of the memory required by the requesting node, the contributing node may only return the start physical address (an example of the second indication information) of the first remote memory (in the contributing node) to the requesting node. Therefore, if the second indication information only indicates the start physical address, the requesting node may determine by default that the capacity of the memory provided by the contributing node is the same as the capacity of the memory required by the requesting node.

Optionally, the length of the first remote memory is greater than the length of the memory required by the requesting node, and the second indication information is used for indicating a start physical address and the length of the first remote memory.

Specifically, if the capacity of the memory provided by the contributing node is greater than the capacity of the memory required by the requesting node, the contributing node may return the start physical address and the length (another example of the second indication information) of the first remote memory (in the contributing node) to the requesting node. Therefore, the requesting node may determine the start physical address and the length of the first remote memory according to the second indication information, and use any storage space in the first remote memory according to needs.

Case 2

The sending, by a requesting node in a memory management system, first indication information includes: sending, by the requesting node in the memory management system, the first indication information to a control center, so that the control center determines the target contributing node from the contributing node and the first remote memory according to the first indication information and a length of the remote memory that can be provided by the contributing node, where the length of the remote memory that can be provided by the contributing node is determined by the control center according to fourth indication information that is sent by the contributing node and is used for indicating the length of the remote memory that can be provided by the contributing node; and the receiving second indication information includes receiving the second indication information sent by the control center.

In this embodiment, the control center may be set in the system, and is configured to acquire information about remote memory that can be provided by a server node, and schedule the remote memory resources together. Moreover, in this embodiment, the control center may be independent of server nodes, that is, the control center may have an independent hardware structure (for example, a processor, a memory and an I/O device), so as to communicate with servers in a manner of signaling, a message or the like; or, a client may also be set in the system of each server node, so as to share a hardware device (for example, a processor, a memory, and an I/O device) such as a processor with each server node.

Specifically, for example, when a server node (a contributing node) is idle or has unused memory, the node can provide another server node with memory (remote memory). Moreover, for example, after clearing data in the remote memory and deleting a page table mapping relationship of the remote memory inside the current node, the contributing node may report, to the control center, information (the fourth indication information) for indicating the remote memory that can be provided by the contributing node. For example, the fourth indication information may indicate a physical address and a length of the remote memory in the contributing node. Therefore, the control center (in other words, a client configured in a requesting node) can know information (for example, routing information of the contributing node in the system) about the contributing node and information (for example, the physical address and the length of the remote memory) about the remote memory provided by the contributing node.

In S110, the requesting node may send request message to a control center, where the request message may carry information (an example of the first indication information) for indicating the memory required by the requesting node.

The control center may determine, according to the first indication information and the fourth indication information, a contributing node and memory (the first remote memory) that can be provided by the contributing node to the requesting node. For example, if a capacity of memory that can be provided by a service node to the outside is greater than or equal to the memory that is provided to the requesting node and is required by the requesting node, the service node may be used as a contributing node. Moreover, in this embodiment, the first remote memory determined by the control center may be greater than or equal to the length of the memory indicated by the first indication information. The first remote memory may be less than or equal to the length of the memory indicated by the fourth indication information.

Moreover, the control center may send information (the second indication information) for indicating the first remote memory to the requesting node and the contributing node, so that the requesting node and the contributing node may both know that the requesting node obtains a right to use the first remote memory in the contributing node. In this embodiment of the present invention, the requesting node may exclusively use the first remote memory, so that security of a service can be improved.

In S120, the requesting node receives the second indication information sent by the control center.

Optionally, the length of the first remote memory is the same as the length of the memory required by the requesting node, and the second indication information is used for indicating a start physical address of the first remote memory.

Specifically, if the capacity of the memory provided by the contributing node is the same as the capacity of the memory required by the requesting node, the contributing node may only return the start physical address (an example of the second indication information) of the first remote memory (in the contributing node) to the requesting node. Therefore, in a case in which the second indication information only indicates the start physical address, the requesting node may determine by default that the capacity of the memory provided by the contributing node is the same as the capacity of the memory required by the requesting node.

Optionally, the length of the first remote memory is greater than the length of the memory required by the requesting node, and the second indication information is used for indicating a start physical address and the length of the first remote memory.

Specifically, if the capacity of the memory provided by the contributing node is greater than the capacity of the memory required by the requesting node, the contributing node may return the start physical address and the length (another example of the second indication information) of the first remote memory (in the contributing node) to the requesting node. Therefore, the requesting node may determine the start physical address and the length of the first remote memory according to the second indication information, and use any storage space in the first remote memory according to needs.

As discussed above, after the requesting node obtains the right to use the first remote memory, in S130, the requesting node may allocate a virtual address (the first virtual address) to the first remote memory.

Optionally, the determining a first virtual address corresponding to the first remote memory includes: determining the first virtual address according to the first remote memory, where the first virtual address is different from a second virtual address allocated to the local memory of the requesting node, and a range of virtual addresses that can be allocated by the requesting node is greater than or equal to a range of a sum of the first remote memory and the local memory.

Specifically, at present, a processor in a general computer system can reach 32 bits to even 64 bits, so that a range of available virtual addresses may reach $2^{32}$ to even $2^{64}$, and a capacity of memory in the general computer system is far less than such values. Therefore, sufficient virtual addresses may be allocated to the first remote memory, and the requesting node may regard the first remote memory as local memory space of the requesting node, so that a method same as or similar to that in the prior art may be used to allocate a virtual address (the first virtual address) the memory space (the first remote memory). Moreover, to avoid indication disorder, it may be regulated that the first virtual address allocated to the first remote memory is different from the second virtual address allocated to the local memory in the requesting node.

Therefore, when data (first data) whose pointer is within the range of the first virtual address needs to be accessed, the first remote memory (specifically, all or part of storage space of the first remote memory) where the first data is stored or needs to be stored may be determined according to the pointer, so as to access the first data in the first remote memory (which is described below in detail).

In the memory management method according to this embodiment, influence on use of local memory by a requesting node can be avoided, so that complexity of a data storage procedure is reduced.

Optionally, the determining a first virtual address corresponding to the first remote memory includes: determining, from local memory within the requesting node, first local memory corresponding to the first remote memory, and determining the first virtual address according to the first local memory.

Specifically, the requesting node may determine a piece of memory space (the first local memory) from the local memory of the requesting node according to the length of the first remote memory, and a correspondence page table between the first local memory and the first remote memory is generated according to a preset algorithm or mapping relationship, for example, according to a preset ratio (for example, 1 byte (Byte) of the local memory corresponds to 1 Kbyte (Kbyte) of remote memory, and it should be understood that the foregoing listed ratio is only exemplary description, to which the present invention is not limited). Because the first local memory is the local memory of the requesting node, a method same as or similar to that in the prior art may be used to allocate a virtual address to the first local memory.

Therefore, when data (first data) whose pointer is within the range of the first virtual address needs to be accessed, the first local memory (specifically, all or part of storage space of the first local memory) may be determined according to the pointer, and the first remote memory (specifically, all or part of storage space of the first remote memory) is determined according to the correspondence page table between the first local memory and the first remote memory generated above, so as to access the first data in the first remote memory (which is described below in detail). Here, it should be noted that in this embodiment, a method same as or similar to that in the prior art may be used to determine the first local memory according to the pointer.

In the memory management method according to this embodiment, changes to an existing data storage procedure and method can be reduced, thereby improving practicability.

In S140, when receiving a read/write instruction (the first data read/write instruction) for the data (first data) whose pointer is within the range of the first virtual address, the requesting node may determine, according to the pointer of the first data, the remote memory where the first data is stored (corresponding to a read instruction) or needs to be stored (corresponding to a write instruction). Subsequently, the requesting node may determine, according to a length of the first data, storage space, for storing the first data, in the first remote memory. Moreover, information (the third indication information) for indicating the storage space is carried in the first data read/write instruction.

For example, in this embodiment, the length of the first remote memory is the same as a length of the first data, and the third indication information is used for indicating a start physical address of the storage space.

Specifically, if a length of the pointer of the first data is the same as the length of the first remote memory, all storage space of the first remote memory needs to be used. In this case, a data read/write instruction (the first data read/write instruction) sent by the requesting node to the contributing node may carry information (an example of the third indication information) for indicating a start physical address of the first remote memory. Therefore, in a case in which the third indication information only indicates the start physical address of the storage space and the indicated start physical address of the storage space is the same as the start physical address of the first remote memory, the contributing node may determine by default that a length of the first data is the same as the length of the first remote memory, so that access of the first data may be implemented.

For another example, in this embodiment, when the length of the first data is less than the length, of the first remote memory, indicated by the second indication information, the third indication information is used for indicating a start physical address and a length of the storage space.

Specifically, if a length of the pointer of the first data is less than the length of the first remote memory, a part of storage space of the first remote memory needs to be used. In this case, a data read/write instruction (the first data read/write instruction) sent by the requesting node to the contributing node may carry information (another example of the third indication information) for indicating a start physical address and the length of a part of storage space of the first remote memory. Therefore, the contributing node may access the first data in the first remote memory according to the third indication information.

Optionally, in this embodiment, the requesting node in the memory management system can acquire contributing node information for indicating the target contributing node; and the sending the first indication information to the target contributing node according to the contributing node information includes: sending a second data write instruction for second data to the target contributing node according to the contributing node information and the second data, where the second data write instruction includes the first indication information; and the receiving the second indication information sent by the target contributing node includes: receiving a second data write response that is sent by the target contributing node and is used for indicating that storage of the second data is completed, where the second data write response includes the second indication information.

Moreover, in this embodiment, the contributing node information includes an identifier of the contributing node in the memory management system or a position of the contributing node in the memory management system; and the request message includes an identifier of the requesting node in the memory management system or a position of the requesting node in the memory management system.

Specifically, in this embodiment, service nodes (including a contributing node and a requesting node) in the system may know routing information of the service nodes, and, the routing information may be a node identifier (Node ID) of the service node, or may be a position of the service node. For example, the server node may broadcast, in the system, information for indicating the Node ID or the position of the service node. Therefore, in S140, the requesting node may send a data read/write instruction (the first data read/write instruction) for the foregoing first data to the contributing node in the system according to routing information of the contributing node. The first data read/write instruction may carry information (the third indication information) for indicating memory space (a part of or all storage space of the first remote memory) where the first data is stored or needs to be stored. The contributing node may receive the first data read/write instruction, determine, according to the third indication information from the first remote memory, memory space (a part of or all storage space of the first remote memory) where the first data is stored or needs to be stored, and access the first data.

Optionally, in this embodiment, the sending the first data read/write instruction for the first data includes broadcasting the first data read/write instruction for the first data, so that the contributing node accesses the first data after determining that the storage space is within a range of the remote memory that can be provided by the contributing node.

Specifically, in this embodiment, after determining storage space where the first data is stored or needs to be stored, the requesting node may broadcast a data read/write instruction (the first data read/write instruction) for the foregoing first data in the system, where the first data read/write instruction may carry information (the third indication information) for indicating the storage space (a part of or all storage space of the first remote memory) where the first data is stored or needs to be stored. Because in Case 1, the contributing node can independently determine the length and the start physical address of the first remote memory, and in Case 2, the contributing node can know the length and the start physical address of the first remote memory from the control center. Therefore, when the storage space, where the first data is stored or needs to be stored, indicated by the foregoing third indication information is within a range of the first remote memory, it may be determined that access of the first data can be performed in the first remote memory.

Therefore, access of data from a requesting node in a contributing node is implemented.

In this embodiment, the memory management system includes at least two contributing nodes, and physical addresses of the remote memory that can be provided by the at least two contributing nodes are different.

Specifically, in a case in which the system includes at least two contributing nodes, the control center may enable that a physical address of remote memory a provided by a contributing node a in at least two contributing nodes is different from a physical address of remote memory b provided by a contributing node b. Therefore, when a requesting node sends the foregoing first data read/write instruction in a broadcast manner, for example, if the requesting node needs to use the remote memory a provided by the contributing node a, the first data read/write instruction carries information (an example of the third indication information) for indicating a physical address of storage space in the remote memory a. When the contributing node b receives the first data read/write instruction, because the physical address indicated by the third indication information is within a range of the physical address of the remote memory b, reading/writing is not performed according to the first data read/write instruction. In comparison, when the contributing node a receives the first data read/write instruction, because the physical address indicated by the third indication information is within a range of the physical address of the remote memory a, reading/writing is performed according to the first data read/write instruction.

In this embodiment, after receiving the first data read/write instruction and determining that reading/writing is not performed according to the first data read/write instruction because the physical address indicated by the third indication information is not within the range of the physical address of the remote memory b, the contributing node b may forward the first data read/write instruction to a neighboring node in the system, so that the first data read/write instruction can reach the contributing node a sooner. Moreover, to prevent a signaling storm from occurring in the system, the contributing node b only forwards the first data read/write instruction one time.

In the memory management method according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

FIG. 2 is a schematic flowchart of a memory management method 200 described from the perspective of a contributing node. As shown in FIG. 2, the method 200 includes the following steps.

S210: A contributing node in a memory management system determines first remote memory, where the first remote memory is determined according to first indication information from a requesting node, the first indication information is used for indicating a length of memory required by the requesting node, and a length of the first remote memory is greater than or equal to the length of the memory required by the requesting node.

In this embodiment, a length of memory represents a size of a capacity of memory.

S220: The contributing node receives a first data read/write instruction for first data sent by the requesting node, where the first data read/write instruction is used for instructing the contributing node to access the first data, the first data read/write instruction includes third indication information, and the third indication information is used for indicating storage space, for storing the first data, in the first remote memory.

S230: The contributing node accesses the first data according to the first data read/write instruction and the third indication information.

Specifically, for example, when a requesting node has insufficient local memory or needs to use large-capacity memory provided by a contributing node to execute an application or process a service, the requesting node may send a request message to the outside, where the request message may carry information (an example of the first indication information) for indicating the memory required by the requesting node. It should be understood that in this embodiment of the present invention, a capacity of the memory indicated by the first indication information may be greater than a capacity of memory required by the requesting node, or may be equal to the capacity of the memory required by the requesting node, which is not specifically limited in the present invention.

In this embodiment, a requesting node may know routing information (an example of contributing node information discussed later) of each contributing node in the system, and directly send the foregoing request message to the contributing node, so that the contributing node may receive the first indication information sent by the requesting node (that is, Case 3), or, a control center discussed later may be disposed in the system to allocate remote memory in a unified manner provided by the contributing nodes in the system (that is, Case 4). Case 3 and Case 4 are separately described below.

Case 3

Optionally, in this embodiment, the determining, by a contributing node in a memory management system, first remote memory includes: receiving, by the contributing node in the memory management system, the first indication information sent by the requesting node; and determining the first remote memory according to the first indication information; and the method further includes sending, to the requesting node, second indication information for indicating the first remote memory.

Specifically, in this embodiment, service nodes (including a contributing node and a requesting node) in the system may know routing information (an example of the contributing node information) of each other, and, the routing information may be a node identifier (Node ID) of the service node, or may be a position of the service node. For example, the contributing node may broadcast, in the system, information (for example, the information may indicate a size of the remote memory and routing information of the contributing node) for indicating remote memory that can be provided by the contributing node. The requesting node may determine, according to the information, the contributing node and the remote memory that can be provided by the contributing node. Therefore, the requesting node may send a request message to the contributing node in the system according to the routing information of the service nodes, where the request message may carry information (an example of the first indication information) for indicating the memory required by the requesting node. Therefore, in S210, after receiving the request message, the contributing node may determine, according to the first indication information that may be carried in the request message and a capacity of memory that the service node can provide to the outside, whether the memory required by the requesting node can be provided to the requesting node.

For example, if the capacity of the memory that can be provided to the outside by the contributing node is greater than or equal to the memory that is provided to the requesting node and required by the requesting node, the remote memory (the first remote memory) whose capacity is greater than or equal to the memory that is provided to the requesting node and required by the requesting node may be determined from local memory.

Moreover, the contributing node may return a response message to the requesting node, where the response message may carry information (the second indication information) for indicating memory (the first remote memory) that can be provided by the service node. Therefore, the requesting node may receive the second indication information sent by the contributing node. Therefore, the requesting node and the contributing node may both know that the requesting node obtains a right to use the first remote memory in the contributing node. In this embodiment of the present invention, the requesting node may exclusively use the first remote memory, so that security of a service can be improved.

Optionally, in this embodiment, the receiving, by the contributing node in the memory management system, the first indication information sent by the requesting node includes receiving, by the contributing node in the memory management system, a second data write instruction for second data sent by the requesting node and the second data, where the second data write instruction includes the first indication information; and determining the first remote memory according to the first indication information, and storing the first data in the first remote memory; and the sending, to the requesting node, second indication information for indicating the first remote memory includes sending, to the requesting node, a second data write response for indicating that storage of the second data is completed, where the second data write response includes the second indication information for indicating the first remote memory.

Specifically, in this embodiment, as discussed above, service nodes (including a contributing node and a requesting node) in the system may know routing information of the service nodes. Therefore, when a requesting node has insufficient local memory or needs to use large-capacity memory provided by a contributing node to execute an application or process a service, for example, when data (an example of the second data) of the application or the service needs to be written, the requesting node may send a data write instruction (an example of the second data write instruction) for the second data to another service node (including the contributing node) in the system according to the routing information of the service nodes. The second data write instruction may carry information (an example of the first indication information) for indicating the memory required by the requesting node. It should be understood that the length of the memory that is indicated by the first indication information and is required by the requesting node may be greater than or equal to a length of the second data, which is not specifically limited in the present invention.

If the foregoing first indication information is carried in the second data write instruction, because the length of the memory that is indicated by the first indication information and is required by the requesting node is greater than or equal to the length of the second data, the contributing node may store the second data in a part of or all storage space of the first remote memory according to the second data write instruction. Therefore, the contributing node may add the second indication information to the second data write response that is sent to the requesting node and is used for indicating that storage of the second data is completed.

It should be understood that the foregoing listed first data and the second data may be same data or may be different data, which is not specifically limited.

Optionally, the length of the first remote memory is the same as the length of the memory required by the requesting node, and the second indication information is used for indicating a start physical address of the first remote memory.

Specifically, if the capacity of the memory provided by the contributing node is the same as the capacity of the memory required by the requesting node, the contributing node may only return the start physical address (an example of the second indication information) of the first remote memory (in the contributing node) to the requesting node. Therefore, in a case in which the second indication information only indicates the start physical address, the requesting node may determine by default that the capacity of the memory provided by the contributing node is the same as the capacity of the memory required by the requesting node.

Optionally, the length of the first remote memory is greater than the length of the memory required by the requesting node, and the second indication information is used for indicating a start physical address and the length of the first remote memory.

Specifically, if the capacity of the memory provided by the contributing node is greater than the capacity of the memory required by the requesting node, the contributing node may return the start physical address and the length (another example of the second indication information) of the first remote memory (in the contributing node) to the requesting node. Therefore, the requesting node may determine the start physical address and the length of the first remote memory according to the second indication information, and use any storage space in the first remote memory according to needs.

Case 4

The determining, by a contributing node in a memory management system, first remote memory includes: sending, by the contributing node in the memory management system, fourth indication information to a control center, where the fourth indication information is used for indicating a start physical address and the length of the remote memory that can be provided by the contributing node; receiving second indication information that is sent by the control center and is used for indicating the first remote memory, where the first remote memory is determined by the control center according to the first indication information and the fourth indication information; and determining the first remote memory according to the second indication information.

In this embodiment, the control center may be set in the system, and is configured to acquire information about remote memory that can be provided by a server node, and schedule the remote memory resources together. Moreover, in this embodiment of the present invention, the control center may be independent of server nodes, that is, the control center may have an independent hardware structure (for example, a processor, a memory, and an I/O device), so as to communicate with servers in a manner of signaling, a message or the like; or, a client may also be set in the system of each server node, so as to share a hardware device (for example, a processor, a memory, and an I/O device) such as a processor with each server node.

Specifically, for example, when a server node (a contributing node) is idle or has unused memory, the node can provide another server node with memory (remote memory). Moreover, for example, after clearing data in the remote memory and deleting a page table mapping relationship of the remote memory inside the current node, the contributing node may report, to the control center, information (the fourth indication information) for indicating the remote memory that can be provided by the contributing node. For example, the fourth indication information may indicate a physical address and a length of the remote memory in the contributing node. Therefore, the control center (in other words, a client configured in a requesting node) can know information (for example, routing information of the contributing node in the system) about the contributing node and information (for example, the physical address and the length of the remote memory) about the remote memory provided by the contributing node.

The requesting node may send a request message to the control center, where the request message may carry information (an example of the first indication information) for indicating the memory required by the requesting node.

The control center may determine, according to the first indication information and the fourth indication information, a contributing node and memory (the first remote memory) that can be provided by the contributing node to the requesting node. For example, if a capacity of memory that can be provided by a service node to the outside is greater than or equal to the memory that is provided to the requesting node and required by the requesting node, the service node may be used as a contributing node. Moreover, in this embodiment, the first remote memory determined by the control center may be greater than or equal to the length of the memory indicated by the first indication information. The first remote memory may be less than or equal to the length of the memory indicated by the fourth indication information.

Moreover, the control center may send information (the second indication information) for indicating the first remote memory to the requesting node and the contributing node. Therefore, in S210, the contributing node may know that the requesting node obtains a right to use the first remote memory in the contributing node. Similarly, the requesting node may also know that the requesting node obtains the right to use the first remote memory in the contributing node.

Optionally, the method further includes acquiring requesting node information for indicating the requesting node; determining the requesting node according to the requesting node information; and forbidding a node other than the requesting node to use the first remote memory.

Specifically, in this embodiment, the requesting node may exclusively use the first remote memory, so that security of a service can be improved.

Optionally, the length of the first remote memory is the same as the length of the memory required by the requesting node, and the second indication information is used for indicating a start physical address of the first remote memory.

Specifically, if the capacity of the memory provided by the contributing node is the same as the capacity of the memory required by the requesting node, the contributing node may only return the start physical address (an example of the second indication information) of the first remote memory (in the contributing node) to the requesting node. Therefore, in a case in which the second indication information only indicates the start physical address, the requesting node may determine by default that the capacity of the memory provided by the contributing node is the same as the capacity of the memory required by the requesting node.

Optionally, the length of the first remote memory is greater than the length of the memory required by the requesting node, and the second indication information is used for indicating a start physical address and the length of the first remote memory.

Specifically, if the capacity of the memory provided by the contributing node is greater than the capacity of the memory required by the requesting node, the contributing node may return the start physical address and the length (another example of the second indication information) of the first remote memory (in the contributing node) to the requesting node. Therefore, the requesting node may determine the start physical address and the length of the first remote memory according to the second indication information, and use any storage space in the first remote memory according to needs.

As discussed above, after the requesting node obtains the right to use the first remote memory, the requesting node may allocate a virtual address (the first virtual address) to the first remote memory.

For example, a processor in a general computer system can reach 32 bits to even 64 bits, so that a range of available virtual addresses may reach $2^{32}$ to even $2^{64}$, and a capacity of memory in the general computer system is far less than such values. Therefore, sufficient virtual addresses may be allocated to the first remote memory, and the requesting node may regard the first remote memory as local memory space of the requesting node, so that a method same as or similar to that in the prior art may be used to allocate a virtual address (the first virtual address) the memory space (the first remote memory). Moreover, to avoid indication disorder, it may be regulated that the first virtual address allocated to the first remote memory is different from a second virtual address allocated to the local memory in the requesting node.

Therefore, when data (first data) whose pointer is within the range of the first virtual address needs to be accessed, the first remote memory (specifically, all or part of storage space of the first remote memory) where the first data is stored or needs to be stored may be determined according to the pointer, so as to access the first data in the first remote memory (which is described below in detail).

In the memory management method according to this embodiment, influence on use of local memory by a requesting node can be avoided, so that complexity of a data storage procedure is reduced.

For another example, the requesting node may determine a piece of memory space (the first local memory) from the local memory of the requesting node according to the length of the first remote memory, and a correspondence page table between the first local memory and the first remote memory is generated according to a preset algorithm or mapping relationship, for example, according to a preset ratio (for example, 1 byte (Byte) of the local memory corresponds to 1 Kbyte (Kbyte) of remote memory, and it should be understood that the foregoing listed ratio is only exemplary description, to which the present invention is not limited). Because the first local memory is the local memory of the requesting node, a method same as or similar to that in the prior art may be used to allocate a virtual address to the first local memory.

Therefore, when data (first data) whose pointer is within the range of the first virtual address needs to be accessed, the first local memory (specifically, all or part of storage space of the first local memory) may be determined according to the pointer, and the first remote memory (specifically, all or part of storage space of the first remote memory) is determined according to the correspondence page table between the first local memory and the first remote memory generated above, so as to access the first data in the first remote memory (which is described below in detail). Here, it should be noted that in this embodiment, a method same as or similar to that in the prior art may be used to determine the first local memory according to the pointer.

In the memory management method according to this embodiment, changes to an existing data storage procedure and method can be reduced, thereby improving practicability.

When receiving a read/write instruction (the first data read/write instruction) for the data (first data) whose pointer is within the range of the first virtual address, the requesting node may determine, according to the pointer of the first data, the remote memory where the first data is stored (corresponding to a read instruction) or needs to be stored (corresponding to a write instruction). Subsequently, the requesting node may determine, according to a length of the first data, storage space, for storing the first data, in the first remote memory. Moreover, information (the third indication information) for indicating the storage space is carried in the first data read/write instruction.

For example, in this embodiment, the length of the first remote memory is the same as a length of the first data, and the third indication information is used for indicating a start physical address of the storage space.

Specifically, if a length of the pointer of the first data is the same as the length of the first remote memory, all storage space of the first remote memory needs to be used, in this case, a data read/write instruction (the first data read/write instruction) sent by the requesting node to the contributing node may carry information (an example of the third indication information) for indicating a start physical address of the first remote memory. Therefore, in a case in which the third indication information only indicates the start physical address of the storage space and the indicated start physical address of the storage space is the same as the start physical address of the first remote memory, the contributing node may determine by default that a length of the first data is the same as the length of the first remote memory, so that access of the first data may be implemented.

For another example, in this embodiment, when the length of the first data is less than the length, of the first remote memory, indicated by the second indication information, the third indication information is used for indicating a start physical address and a length of the storage space.

Specifically, if a length of the pointer of the first data is less than the length of the first remote memory, a part of storage space of the first remote memory needs to be used. In this case, a data read/write instruction (the first data read/write instruction) sent by the requesting node to the contributing node may carry information (another example of the third indication information) for indicating a start physical address and the length of a part of storage space of the first remote memory. Therefore, the contributing node may access the first data in the first remote memory according to the third indication information.

In this embodiment, service nodes (including a contributing node and a requesting node) in the system may know routing information of the service nodes, and, the routing information may be a node identifier (Node ID) of the service node, or may be a position of the service node. For example, the server node may broadcast, in the system, information for indicating the Node ID or the position of the service node. Therefore, the requesting node may send a data read/write instruction (the first data read/write instruction) for the foregoing first data to the contributing node in the system according to routing information of the contributing node. The first data read/write instruction may carry information (the third indication information) for indicating memory space (a part of or all storage space of the first remote memory) where the first data is stored or needs to be stored. Therefore, in S220, the contributing node may receive the first data read/write instruction, in S230, determine, according to the third indication information from the first remote memory, memory space (a part of or all storage space of the first remote memory) where the first data is stored or needs to be stored, and access the first data.

In this embodiment, after determining storage space where the first data is stored or needs to be stored, the requesting node may broadcast, in the system, a data read/write instruction (the first data read/write instruction) for the foregoing first data. The first data read/write instruction may carry information (the third indication information) for indicating the storage space (a part of or all storage space of the first remote memory) where the first data is stored or needs to be stored. Therefore, in S220, the contributing node may receive the first data read/write instruction. Because in Case 3, the contributing node can independently determine the length and a start physical address of the first remote memory, in Case 4, the contributing node can know the length and the start physical address of the first remote memory from the control center. Therefore, when the storage space, where the first data is stored or needs to be stored, indicated by the foregoing third indication information is within a range of the first remote memory, in S230, the contributing node may determine that access of the first data can be performed in the first remote memory.

Therefore, access of data from a requesting node in a contributing node is implemented.

In the memory management method according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

FIG. 3 is a schematic flowchart of a memory management method 300 described from the perspective of a control center. As shown in FIG. 3, the method 300 includes the following steps.

S310: A control center in a memory management system determines a start physical address and a length of remote memory that can be provided by at least one contributing node.

S320: The control center receives first indication information sent by a requesting node, where the first indication information is used for indicating a length of memory required by the requesting node.

In this embodiment, a length of memory represents a size of a capacity of memory.

S330: The control center determines, from the contributing node according to the first indication information and the start physical address and the length of the remote memory that can be provided by the at least one contributing node, a target contributing node and first remote memory provided by the target contributing node to the requesting node, where a length of the first remote memory is greater than or equal to the length of the memory required by the requesting node.

S340: The control center sends, to the requesting node and the target contributing node, second indication information for indicating the first remote memory, so that the requesting node and the target contributing node determine the first remote memory according to the second indication information, and access first data in the first remote memory, where a pointer of the first data is within a range of a first virtual address allocated by the requesting node to the first remote memory.

Specifically, in this embodiment, the control center may be set in the system, and is configured to acquire information about remote memory that can be provided by a server node, and schedule the remote memory resources together. Moreover, in this embodiment, the control center may be independent of server nodes, that is, the control center may have an independent hardware structure (for example, a processor, a memory, and an I/O device), so as to communicate with servers in a manner of signaling, a message or the like, or, a client may also be set in the system of each server node, so as to share a hardware device (for example, a processor, a memory, and an I/O device) such as a processor with each server node.

In this embodiment, the control center may maintain one set of remote memory, so that the start physical address and the length of the remote memory that can be provided by the at least one contributing node may be determined.

Optionally, the determining, by the control center in a memory management system, a start physical address and a length of remote memory that can be provided by at least one contributing node includes receiving, by the control center in the memory management system, fourth indication information sent by the at least one contributing node, where the fourth indication information is used for indicating the start physical address and the length of remote memory that can be provided by the contributing node; and determining, by according to the fourth indication information, the start physical address and the length of the remote memory that can be provided by the at least one contributing node.

Specifically, for example, when a server node (a contributing node) is idle or has unused memory, the node can provide another server node with memory (remote memory). Moreover, for example, after clearing data in the remote memory and deleting a page table mapping relationship of the remote memory inside the current node, the contributing node may report, to the control center, information (the fourth indication information) for indicating the remote memory that can be provided by the contributing node. For example, the fourth indication information may indicate a physical address and a length of the remote memory in the contributing node.

Therefore, in S310, the control center (in other words, a client configured in a requesting node) can know information (for example, routing information of the contributing node in the system) about the contributing node and information (for example, the physical address and the length of the remote memory) about the remote memory provided by the contributing node.

The requesting node may send request message to the control center, where the request message may carry information (an example of the first indication information) for indicating the memory required by the requesting node.

Therefore, in S320, the control center can know the first indication information.

In S330, the control center may determine, according to the first indication information and the fourth indication information, a contributing node and memory (the first remote memory) that can be provided by the contributing node to the requesting node. For example, if a capacity of memory that can be provided by a service node to the outside is greater than or equal to the memory that is provided to the requesting node and required by the requesting node, the service node may be used as a contributing node. Moreover, in this embodiment of the present invention, the first remote memory determined by the control center may be greater than or equal to the length of the memory indicated by the first indication information. The first remote memory may be less than or equal to the length of the memory indicated by the fourth indication information.

In S340, the control center may send information (the second indication information) for indicating the first remote memory to the requesting node and the contributing node, so that the requesting node and the contributing node may both know that the requesting node obtains a right to use the first remote memory in the contributing node. In this embodiment, the requesting node may exclusively use the first remote memory, so that security of a service can be improved.

Optionally, the length of the first remote memory is the same as the length of the memory required by the requesting node, and the second indication information is used for indicating a start physical address of the first remote memory.

Specifically, if a capacity of the memory provided by the contributing node is the same as the capacity of the memory required by the requesting node, the contributing node may only return the start physical address (an example of the second indication information) of the first remote memory (in the contributing node) to the requesting node. Therefore, in a case in which the second indication information only indicates the start physical address, the requesting node may determine by default that the capacity of the memory provided by the contributing node is the same as the capacity of the memory required by the requesting node.

Optionally, the length of the first remote memory is greater than the length of the memory required by the requesting node, and the second indication information is used for indicating a start physical address and the length of the first remote memory.

Specifically, if the capacity of the memory provided by the contributing node is greater than the capacity of the memory required by the requesting node, the contributing node may return the start physical address and the length (another example of the second indication information) of the first remote memory (in the contributing node) to the requesting node. Therefore, the requesting node may determine the start physical address and the length of the first remote memory according to the second indication information, and use any storage space in the first remote memory according to needs.

As discussed above, after the requesting node obtains the right to use the first remote memory, the requesting node may allocate a virtual address (the first virtual address) to the first remote memory.

For example, a processor in a general computer system can reach 32 bits to even 64 bits, so that a range of available virtual addresses may reach 232 to even 264, and a capacity of memory in the general computer system is far less than such values. Therefore, sufficient virtual addresses may be allocated to the first remote memory, the requesting node may regard the first remote memory as local memory space of the requesting node, so that a method same as or similar to that in the prior art may be used to allocate a virtual address (the first virtual address) the memory space (the first remote memory). Moreover, to avoid indication disorder, it may be regulated that the first virtual address allocated to the first remote memory is different from a second virtual address allocated to the local memory in the requesting node.

Therefore, when data (first data) whose pointer is within the range of the first virtual address needs to be accessed, the first remote memory (specifically, all or part of storage space of the first remote memory) where the first data is stored or needs to be stored may be determined according to the pointer, so as to access the first data in the first remote memory (which is described below in detail).

In the memory management method according to this embodiment, influence on use of local memory by a requesting node can be avoided, so that complexity of a data storage procedure is reduced.

For another example, the requesting node may determine a piece of memory space (the first local memory) from the local memory of the requesting node according to the length of the first remote memory, and a correspondence page table between the first local memory and the first remote memory is generated according to a preset algorithm or mapping relationship, for example, according to a preset ratio (for example, 1 byte (Byte) of the local memory corresponds to 1 Kbyte (Kbyte) of remote memory, and it should be understood that the foregoing listed ratio is only exemplary description, to which the present invention is not limited). Because the first local memory is the local memory of the requesting node, a method same as or similar to that in the prior art may be used to allocate a virtual address to the first local memory.

Therefore, when data (first data) whose pointer is within the range of the first virtual address needs to be accessed, the first local memory (specifically, all or part of storage space of the first local memory) may be determined according to the pointer, and the first remote memory (specifically, all or part of storage space of the first remote memory) is determined according to the correspondence page table between the first local memory and the first remote memory generated above, so as to access the first data in the first remote memory (which is described below in detail). Here, it should be noted that in this embodiment, a method same as or similar to that in the prior art may be used to determine the first local memory according to the pointer.

In the memory management method according to this embodiment, changes to an existing data storage procedure and method can be reduced, thereby improving practicability.

When receiving a read/write instruction (the first data read/write instruction) for the data (first data) whose pointer is within the range of the first virtual address, the requesting node may determine, according to the pointer of the first data, the remote memory where the first data is stored (corresponding to a read instruction) or needs to be stored (corresponding to a write instruction). Subsequently, the requesting node may determine, according to a length of the first data, storage space, for storing the first data, in the first remote memory. Moreover, information (the third indication information) for indicating the storage space is carried in the first data read/write instruction.

For example, in this embodiment, the length of the first remote memory is the same as a length of the first data, and the third indication information is used for indicating a start physical address of the storage space.

Specifically, if a length of the pointer of the first data is the same as the length of the first remote memory, all storage space of the first remote memory needs to be used, in this case, a data read/write instruction (the first data read/write instruction) sent by the requesting node to the contributing node may carry information (an example of the third indication information) for indicating a start physical address of the first remote memory. Therefore, in a case in which the third indication information only indicates the start physical address of the storage space and the indicated start physical address of the storage space is the same as the start physical address of the first remote memory, the contributing node may determine by default that a length of the first data is the same as the length of the first remote memory, so that access of the first data may be implemented.

For another example, in this embodiment, when the length of the first data is less than the length, of the first remote memory, indicated by the second indication information, the third indication information is used for indicating a start physical address and a length of the storage space.

Specifically, if a length of the pointer of the first data is less than the length of the first remote memory, a part of storage space of the first remote memory needs to be used, in this case, a data read/write instruction (the first data read/write instruction) sent by the requesting node to the contributing node may carry information (another example of the third indication information) for indicating a start physical address and the length of a part of storage space of the first remote memory. Therefore, the contributing node may access the first data in the first remote memory according to the third indication information.

Optionally, in this embodiment, the method further includes sending, to the requesting node, contributing node information for indicating the target contributing node, so that the requesting node sends a first data read/write instruction for the first data to the target contributing node according to the contributing node information.

Moreover, in this embodiment, the contributing node information includes an identifier of the contributing node in the memory management system or a position of the contributing node in the memory management system.

The request message includes an identifier of the requesting node in the memory management system or a position of the requesting node in the memory management system.

Specifically, in this embodiment, the control center may notify the requesting node of routing information of the contributing node. Therefore, the requesting node may send a data read/write instruction (the first data read/write instruction) for the foregoing first data to the contributing node in the system according to the routing information of the contributing node. The first data read/write instruction may carry information (the third indication information) for indicating memory space (a part of or all storage space of the first remote memory) where the first data is stored or needs to be stored. The contributing node may receive the first data read/write instruction, determine, according to the third indication information from the first remote memory, memory space (a part of or all storage space of the first remote memory) where the first data is stored or needs to be stored, and access the first data.

Optionally, in this embodiment, the method further includes sending, to the contributing node, requesting node information for indicating the requesting node, so that the target contributing node determines the requesting node according to the requesting node information and forbids a node other than the requesting node to use the first remote memory.

Specifically, in this embodiment, the control center may notify the contributing node of routing information of the requesting node. Therefore, according to the routing information of the requesting node, the contributing node may only allow the requesting node to use the first remote memory and forbid another node (including the contributing node) to use the first remote memory, so that security of a network can be improved.

Optionally, in this embodiment, the memory management system includes at least two contributing nodes, and the determining, from the contributing node according to the first indication information and the fourth indication information, a target contributing node and first remote memory provided by the target contributing node to the requesting node includes determining, from the contributing node according to the first indication information and the fourth indication information, the target contributing node and the first remote memory provided by the target contributing node to the requesting node, so that physical addresses of the remote memory that is provided by the contributing nodes and includes the first remote memory are different.

Specifically, in a case in which the system includes at least two contributing nodes, the control center may enable that a physical address of remote memory a provided by a contributing node a in at least two contributing nodes is different from a physical address of remote memory b provided by a contributing node b. Therefore, when a requesting node sends the foregoing first data read/write instruction in a broadcast manner, for example, if the requesting node needs to use the remote memory a provided by the contributing node a, the first data read/write instruction carries information (an example of the third indication information) for indicating a physical address of storage space in the remote memory a. When the contributing node b receives the first data read/write instruction, because the physical address indicated by the third indication information is within a range of the physical address of the remote memory b, reading/writing is not performed according to the first data read/write instruction. In comparison, when the contributing node a receives the first data read/write instruction, because the physical address indicated by the third indication information is within a range of the physical address of the remote memory a, reading/writing is performed according to the first data read/write instruction.

In this embodiment, after receiving the first data read/write instruction and determining that reading/writing is not performed according to the first data read/write instruction because the physical address indicated by the third indication information is not within the range of the physical address of the remote memory b, the contributing node b may forward the first data read/write instruction to a neighboring node in the system, so that the first data read/write instruction can reach the contributing node a sooner. Moreover, to prevent a signaling storm from occurring in the system, the contributing node b only forwards the first data read/write instruction one time.

In the memory management method according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

The memory management methods according to the embodiments are described above in detail with reference to FIG. 1 to FIG. 3. Memory management apparatuses according to embodiments are described below in detail with reference to FIG. 4 to FIG. 6.

Figure 4:
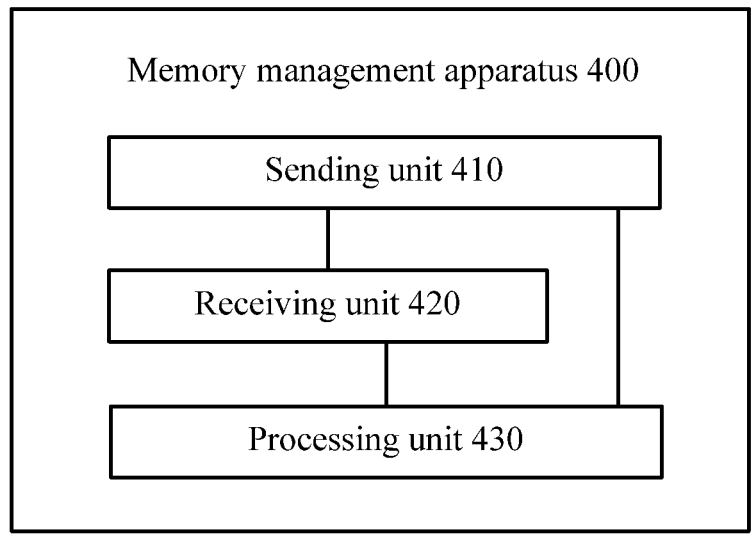
FIG. 4 is a schematic block diagram of a memory management apparatus according to an embodiment.
Figure 7:
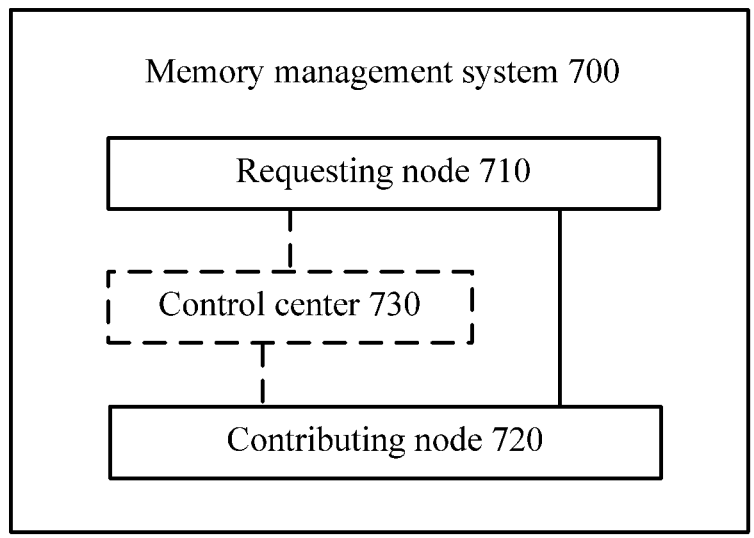
FIG. 7 is a schematic block diagram of a memory management system according to an embodiment.

FIG. 4 is a schematic block diagram of a memory management apparatus 400 according to an embodiment. As shown in FIG. 7, the apparatus 400 includes the following.

The memory management apparatus 400 according to this embodiment of the present invention may correspond to a requesting node in the methods in the embodiments of the present invention, and, the units, that is, modules and other operations and/or functions above in the memory management apparatus 400 are separately for implementing corresponding procedures in the method 100 in FIG. 1, which are no longer elaborated here for simplicity.

For the memory management apparatus according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

FIG. 4 is the schematic block diagram of the memory management apparatus 400 according to this embodiment. As shown in FIG. 7, the apparatus 400 includes a sending unit 410, configured to enable a requesting node in a memory management system to send first indication information, where the first indication information is used for indicating a length of memory required by the requesting node; a receiving unit 420, configured to receive second indication information, where the second indication information is used for indicating first remote memory provided to the requesting node by a target contributing node in at least one contributing node that can provide remote memory, the first remote memory is determined according to the first indication information, and a length of the first remote memory is greater than or equal to the length of the memory required by the requesting node; and a processing unit 430, configured to determine, from available virtual addresses, a first virtual address corresponding to the first remote memory; and configured to: when first data whose pointer is within a range of the first virtual address needs to be read/written, control the sending unit 410 to send a first data read/write instruction for the first data, where the first data read/write instruction includes third indication information, and the third indication information is used for indicating storage space, for storing the first data, in the first remote memory, so that the target contributing node accesses the first data according to the third indication information.

In this embodiment, a length of memory represents a size of a capacity of memory.

Optionally, the processing unit 430 is specifically configured to acquire contributing node information for indicating the target contributing node; the sending unit is specifically 410 configured to send the first indication information to the target contributing node according to the contributing node information; and the receiving unit 420 is specifically configured to receive the second indication information sent by the target contributing node.

Optionally, the sending unit 410 is specifically configured to send a second data write instruction for second data to the target contributing node according to the contributing node information, where the second data write instruction includes the first indication information; and the receiving unit 420 is specifically configured to receive a second data write response that is sent by the target contributing node and is used for indicating that storage of the second data is completed, where the second data write response includes the second indication information.

Optionally, the sending unit 410 is specifically configured to send the first indication information to a control center, so that the control center determines the target contributing node from the contributing node and the first remote memory according to the first indication information and a length of the remote memory that can be provided by the contributing node, where the length of the remote memory that can be provided by the contributing node is determined by the control center according to fourth indication information that is sent by the contributing node and is used for indicating the length of the remote memory that can be provided by the contributing node; and the receiving unit 420 is specifically configured to receive the second indication information sent by the control center.

Optionally, the receiving unit 420 is further configured to receive contributing node information that is sent by the control center and is used for indicating the target contributing node, and the sending unit 410 is specifically configured to send the first data read/write instruction for the first data to the target contributing node according to the contributing node information.

Optionally, the sending unit 410 is specifically configured to broadcast the first data read/write instruction for the first data, so that the contributing node accesses the first data after determining that the storage space is within a range of the remote memory that can be provided by the contributing node.

Optionally, the memory management system includes at least two contributing nodes, and physical addresses of the remote memory that can be provided by the at least two contributing nodes are different.

Optionally, the processing unit 430 is specifically configured to determine, from local memory within the requesting node, first local memory corresponding to the first remote memory; and configured to determine the first virtual address according to the first local memory.

Optionally, the length of the first remote memory is the same as the length of the memory required by the requesting node, and the second indication information is used for indicating a start physical address of the first remote memory; and the length of the first remote memory is the same as a length of the first data, and the third indication information is used for indicating a start physical address of the storage space.

Optionally, the second indication information is used for indicating a start physical address and the length of the first remote memory; when a length of the first data is the same as the length, of the first remote memory, indicated by the second indication information, the third indication information is used for indicating the start physical address of the first remote memory; or when a length of the first data is less than the length, of the first remote memory, indicated by the second indication information, the third indication information is used for indicating a start physical address and a length of the storage space.

The memory management apparatus 400 according to this embodiment may correspond to a requesting node in the methods in the embodiments of the present invention, and, the units, that is, modules and other operations and/or functions above in the memory management apparatus 400 are separately for implementing corresponding procedures in the method 100 in FIG. 1, which are no longer elaborated here for simplicity.

For the memory management apparatus according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

Figure 5:
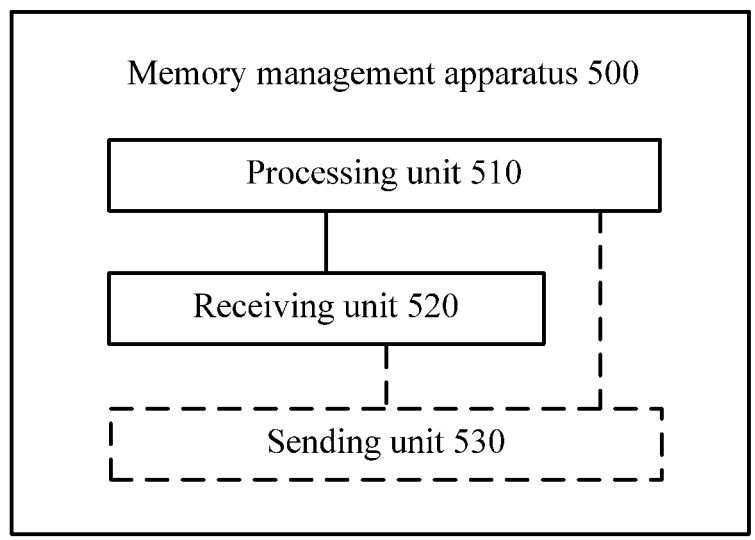
FIG. 5 is a schematic block diagram of a memory management apparatus according to another embodiment.

FIG. 5 is a schematic block diagram of a memory management apparatus 500 according to an embodiment. As shown in FIG. 5, the apparatus 500 includes a processing unit 510, configured to enable a contributing node in a memory management system to determine first remote memory, where the first remote memory is determined according to first indication information from a requesting node, the first indication information is used for indicating a length of memory required by the requesting node, and a length of the first remote memory is greater than or equal to the length of the memory required by the requesting node; and a receiving unit 520, configured to receive a first data read/write instruction for first data sent by the requesting node, where the first data read/write instruction is used for instructing the contributing node to access the first data, the first data read/write instruction includes third indication information, and the third indication information is used for indicating storage space, for storing the first data, in the first remote memory; where the processing unit 510 is further configured to access the first data according to the first data read/write instruction and the third indication information.

In this embodiment, a length of memory represents a size of a capacity of memory.

Optionally, the receiving unit 520 is specifically configured to receive the first indication information sent by the requesting node; and the processing unit 510 is specifically configured to determine the first remote memory according to the first indication information; and the apparatus further includes: a sending unit 530, configured to send, to the requesting node, second indication information for indicating the first remote memory.

Optionally, the receiving unit 520 is specifically configured to receive a second data write instruction for second data sent by the requesting node and the second data, where the second data write instruction includes the first indication information; the processing unit 510 is specifically configured to determine the first remote memory according to the first indication information, and store the first data in the first remote memory; and the sending unit 530 is specifically configured to send, to the requesting node, a second data write response for indicating that storage of the second data is completed, where the second data write response includes the second indication information for indicating the first remote memory.

Optionally, the apparatus further includes: a sending unit 530, configured to send fourth indication information to a control center, where the fourth indication information is used for indicating a start physical address and a length of remote memory that can be provided by the contributing node; where the receiving unit 520 is specifically configured to receive second indication information that is sent by the control center and is used for indicating the first remote memory, where the first remote memory is determined by the control center according to the first indication information and the fourth indication information; and the processing unit 510 is specifically configured to determine the first remote memory according to the second indication information.

Optionally, the processing unit 510 is specifically configured to determine that the storage space is within a range of the first remote memory; and configured to access the first data in the storage space according to the first data read/write instruction.

Optionally, the length of the memory required by the requesting node is the same as a length of the first data, a length of remote memory that can be provided by a target contributing node is the same as the length of the memory required by the requesting node, and the second indication information and the third indication information are used for indicating a start physical address of the first remote memory.

Optionally, the second indication information is used for indicating a start physical address and the length of the first remote memory; when a length of the first data is the same as the length, of the first remote memory, indicated by the second indication information, the third indication information is used for indicating the start physical address of the first remote memory; or when a length of the first data is less than the length, of the first remote memory, indicated by the second indication information, the third indication information is used for indicating a start physical address and a length of the storage space.

Optionally, the processing unit 510 is further configured to acquire requesting node information for indicating the requesting node; configured to determine the requesting node according to the requesting node information; and configured to forbid a node other than the requesting node to use the first remote memory.

The memory management apparatus 500 according to this embodiment may correspond to a contributing node in the methods in the embodiments, and, the units, that is, modules and other operations and/or functions above in the memory management apparatus 500 are separately for implementing corresponding procedures in the method 200 in FIG. 2, which are no longer elaborated here for simplicity.

For the memory management apparatus according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

Figure 6:
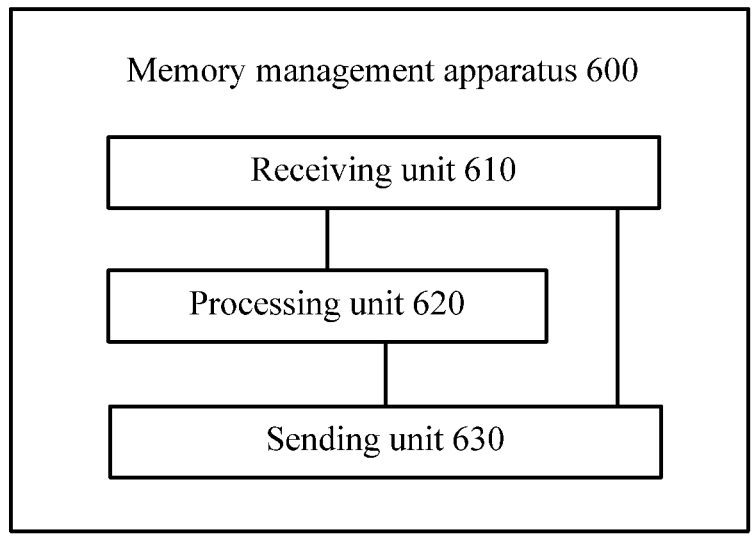
FIG. 6 is a schematic block diagram of a memory management apparatus according to still another embodiment.

FIG. 6 is a schematic block diagram of a memory management apparatus 600 according to an embodiment. As shown in FIG. 6, the apparatus 600 includes a receiving unit 610, configured to enable a control center in a memory management system to determine a start physical address and a length of remote memory that can be provided by at least one contributing node; and configured to receive first indication information sent by a requesting node, where the first indication information is used for indicating a length of memory required by the requesting node; a processing unit 620, configured to determine, from the contributing node according to the first indication information and the start physical address and the length of the remote memory that can be provided by the at least one contributing node, a target contributing node and first remote memory provided by the target contributing node to the requesting node, where a length of the first remote memory is greater than or equal to the length of the memory required by the requesting node; and a sending unit 630, configured to send, to the requesting node and the target contributing node, second indication information for indicating the first remote memory, so that the requesting node and the target contributing node determine the first remote memory according to the second indication information, and access first data in the first remote memory, where a pointer of the first data is within a range of a first virtual address allocated by the requesting node to the first remote memory.

In this embodiment, a length of memory represents a size of a capacity of memory.

Optionally, the sending unit 630 is further configured to send, to the requesting node, contributing node information for indicating the target contributing node, so that the requesting node sends a first data read/write instruction for the first data to the target contributing node according to the contributing node information.

Optionally, the sending unit 630 is further configured to send, to the contributing node, requesting node information for indicating the requesting node, so that the target contributing node determines the requesting node according to the requesting node information and forbids a node other than the requesting node to use the first remote memory.

Optionally, the memory management system includes at least two contributing nodes, and the processing unit 620 is specifically configured to determine, from the contributing node according to the first indication information and fourth indication information, the target contributing node and the first remote memory provided by the target contributing node to the requesting node, so that physical addresses of the remote memory that is provided by the contributing nodes and includes the first remote memory are different.

Optionally, the length of the memory required by the requesting node is the same as a length of the first data, the length of the remote memory that can be provided by the target contributing node is the same as the length of the memory required by the requesting node, and the second indication information and the third indication information are used for indicating a start physical address of the first remote memory.

Optionally, the second indication information is used for indicating a start physical address and the length of the first remote memory; when a length of the first data is the same as the length, of the first remote memory, indicated by the second indication information, the third indication information is used for indicating the start physical address of the first remote memory; or when a length of the first data is less than the length, of the first remote memory, indicated by the second indication information, the third indication information is used for indicating a start physical address and a length of storage space for storing the first data.

Optionally, the receiving unit 610 is further configured to receive the fourth indication information sent by at least one contributing node, where the fourth indication information is used for indicating a start physical address and the length of the remote memory that can be provided by the contributing node; and the processing unit 620 is specifically configured to determine, according to the fourth indication information, the start physical address and the length of the remote memory that can be provided by the at least one contributing node.

The memory management apparatus 600 according to this embodiment may correspond to a control center in the methods in the embodiments, and, the units, that is, modules and other operations and/or functions above in the memory management apparatus 600 are separately for implementing corresponding procedures in the method 300 in FIG. 3, which are no longer elaborated here for simplicity.

For the memory management apparatus according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

The memory management methods and apparatuses according to the embodiments are described above in detail with reference to FIG. 1 to FIG. 6. A memory management system according to an embodiment of the present invention is described below in detail with reference to FIG. 7.

FIG. 7 is a schematic block diagram of a memory management system 700 according to an embodiment of the present invention. As shown in FIG. 7, the system 700 includes at least one requesting node 710, configured to send first indication information, where the first indication information is used for indicating a length of memory required by the requesting node, receive second indication information, where the second indication information is used for indicating first remote memory provided to the requesting node by a target contributing node in at least one contributing node that can provide remote memory, the first remote memory is determined according to the first indication information, and a length of the first remote memory is greater than or equal to the length of the memory required by the requesting node, determine, from available virtual addresses, a first virtual address corresponding to the first remote memory, and when first data whose pointer is within a range of the first virtual address needs to be read/written, send a first data read/write instruction for the first data, where the first data read/write instruction includes third indication information, and the third indication information is used for indicating storage space, for storing the first data, in the first remote memory, so that the target contributing node accesses the first data according to the third indication information; and the at least one contributing node 720, configured to determine the first remote memory, where the first remote memory is determined according to the first indication information from the requesting node, the first indication information is used for indicating the length of the memory required by the requesting node, and the length of the first remote memory is greater than or equal to the length of the memory required by the requesting node, receive the first data read/write instruction, for the first data, sent by the requesting node, where the first data read/write instruction is used for instructing the contributing node to access the first data, the first data read/write instruction includes the third indication information, and the third indication information is used for indicating the storage space, for storing the first data, in the first remote memory, and access the first data according to the first data read/write instruction and the third indication information.

In this embodiment, a length of memory represents a size of a capacity of memory.

Optionally, the system further includes a control center 730, configured to determine a start physical address and a length of the remote memory that can be provided by the at least one contributing node, receive the first indication information sent by the requesting node, where the first indication information is used for indicating the length of the memory required by the requesting node, determine, from the contributing node according to the first indication information and the start physical address and the length of the remote memory that can be provided by the at least one contributing node, the target contributing node and the first remote memory provided by the target contributing node to the requesting node, where the length of the first remote memory is greater than or equal to the length of the memory required by the requesting node, and send, to the requesting node and the target contributing node, the second indication information for indicating the first remote memory, so that the requesting node and the target contributing node determine the first remote memory according to the second indication information, and access first data in the first remote memory, where the pointer of the first data is within the range of the first virtual address allocated by the requesting node to the first remote memory.

The requesting node 710 according to this embodiment may correspond to a requesting node in the methods of the embodiments, and, the units, that is, modules and other operations and/or functions above in the requesting node 710 are separately for implementing corresponding procedures in the method 100 in FIG. 1, which are no longer elaborated here for simplicity.

The contributing node 720 according to this embodiment may correspond to a contributing node in the methods of the embodiments, and, the units, that is, modules and other operations and/or functions above in the contributing node 720 are separately for implementing corresponding procedures in the method 200 in FIG. 2, which are no longer elaborated here for simplicity.

The control center 730 according to this embodiment may correspond to a control center in the methods of the embodiments, and, the units, that is, modules and other operations and/or functions above in the control center 730 are separately for implementing corresponding procedures in the method 300 in FIG. 3, which are no longer elaborated here for simplicity.

Figure 8:
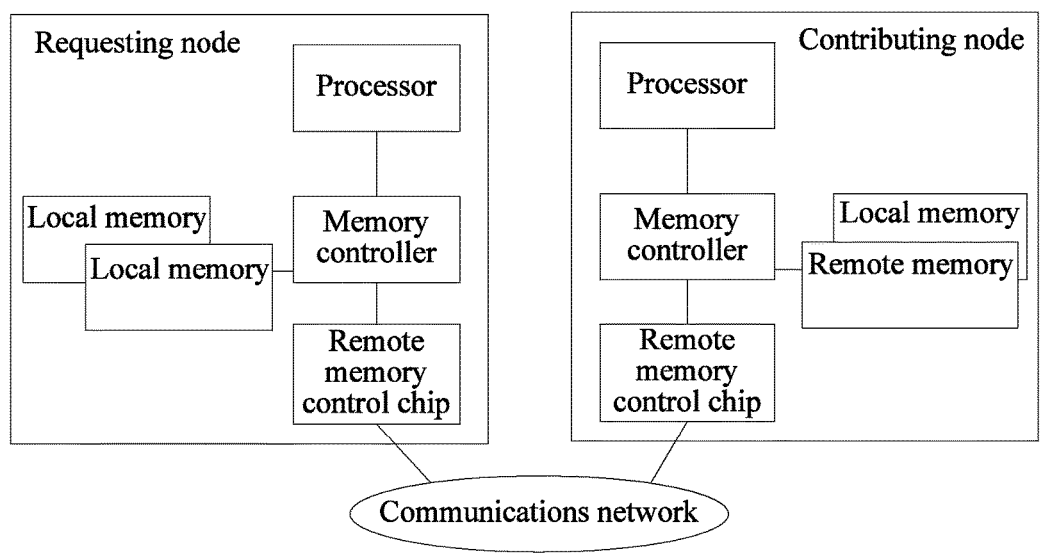
FIG. 8 is a schematic structural diagram of a memory management system according to an embodiment.

FIG. 8 is a schematic structure of a memory management system according to an embodiment. As shown in FIG. 8, a node (including a requesting node and a contributing node) in the system includes a local memory, a processor memory controller, and a remote memory control chip. A remote memory control chip of a requesting node may implement, separately or together with a processor, the functions of the memory management apparatus 400 or 710 in the embodiment (that is, the procedures in the method 100 in FIG. 1), specifically, may implement information transmission with a contributing node or a control center, and may determine a correspondence between remote memory provided by a contributing node and a virtual address provided by a processor. A remote memory control chip of a contributing node may implement, separately or together with a processor, the functions in the memory management apparatus 500 or 720 in the embodiment (that is, the procedures in the method 200 in FIG. 2), specifically, may implement information transmission with a requesting node or a control center, and may access data from a requesting node in the remote memory provided by the contributing node.

It should be understood that the foregoing listed structures of the requesting node and the contributing node are only exemplary description, and the present invention is not limited thereto. For example, a remote memory control chip may also be integrated in a processor.

For the memory management system according to this embodiment, remote memory for use by a requesting node is determined from a contributing node according to memory required by the requesting node and memory that can be provided by the contributing node, a virtual address is allocated to the remote memory in the requesting node, and when the requesting node needs to store data whose pointer is within a range of the virtual address, it may be determined according to a correspondence between the virtual address and the remote memory that the data needs to be accessed on the contributing node, so that a data read/write instruction may be sent to the contributing node, so as to implement access of the data on the remote memory, so that sharing of memory can be easily implemented.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   sending, by a contributing node to a control center, a start physical address and a length of a remote memory provided by the contributing node;
   receiving, by the contributing node, information for a first remote memory from the control center indicating that the contributing node has been selected by the control center to provide remote memory to a requesting node, wherein the selection is based on the start physical address of the remote memory, the length of the remote memory, and a length of memory required by the requesting node;
   providing, by the contributing node, the first remote memory for use by the requesting node, wherein a length of the first remote memory is greater than or equal to the length of the memory required by the requesting node;

receiving, by the contributing node, a read or write instruction from the requesting node for reading or writing first data, respectively, wherein the instruction instructs the contributing node to access the first data and indicates a storage space for storing the first data in the first remote memory; and accessing, by the contributing node, the first data according to the instruction and the indicated storage space.

2. The method according to claim 1, wherein accessing the first data comprises:

determining, by the contributing node, that the storage space is within an address range of the first remote memory; and based on the determination, accessing by the contributing node the first data in the storage space according to the instruction.

3. The method according to claim 1, wherein accessing, by the contributing node, the first data comprising:

acquiring, by the contributing node, node information for the requesting node;

determining, by the contributing node, that the node information corresponds to the requesting node; and based on the determination, accessing, by the contributing node, the first data in the storage space according to the instruction.

4. A contributing node in a memory management system, the contributing node comprising:

a memory comprising instructions; and one or more processors in communication with the memory, wherein the one or more processors execute the instructions to:

send a start physical address and a length of a remote memory provided by the contributing node to a control center;

receive information for a first remote memory from the control center indicating that the contributing node has been selected by the control center to provide remote memory to a requesting node, wherein the selection is based on the start physical address of the remote memory, the length of the remote memory, and a length of memory required by the requesting node;

provide the first remote memory for use by the requesting node, wherein a length of the first remote memory is greater than or equal to the length of the memory required by the requesting node; and receive a first data read or write instruction from the requesting node for reading or writing first data, respectively, wherein the instruction instructs the contributing node to access the first data and indicates storage space, for storing the first data, in the first remote memory; and access the first data according to the instruction and the indicated storage space.

5. The contributing node according to claim 4, wherein the one or more processors execute the instructions to:

determining that the storage space is within an address range of the first remote memory; and based on the determination, accessing the first data in the storage space according to the instruction.

6. The contributing node according to claim 4, wherein the one or more processors execute the instructions to:

acquire node information for the requesting node;

determine that the node information corresponds to the requesting node; and based on the determination, access the first data in the storage space according to the instruction.

7. A system, comprising:

a requesting node;

a contributing node; and a control center;

wherein the requesting node is configured to send a length of memory required by the requesting node to the control center;

the contributing node is configured to send a start physical address and a length of a remote memory provided by the contributing node to the control center;

the control center is configured to select the contributing node to provide a first remote memory to the requesting node according to the start physical address of the remote memory, the length of the remote memory, and a length of memory required by the requesting node, and send information for the first remote memory to the control center and the requesting node;

the requesting node is further configured to send a read or write instruction for reading or writing first data, respectively, wherein the instruction instructs the contributing node to access the first data and indicates a storage space for storing the first data in the first remote memory;

the contributing node is further configured to provide the first remote memory for use by the requesting node based on the information for the first remote memory received from the control center, wherein a length of the first remote memory is greater than or equal to the length of the memory required by the requesting node, and access the first data according to the read or write instruction and the storage space indicated in the read or write instruction.

8. A memory management method implemented by a control center, comprising:

receiving, from at least one contributing node, a start physical address and a length of remote memory provided by each of the at least one contributed node;

receiving, from a requesting node, a length of memory required by the requesting node;

selecting a target contributing node from the at least one contributing nodes and determine a first remote memory provided by the target contributing node based on the length of memory required by the requesting node, and the start physical address and the length of the remote memory of the target contributing node, wherein the length of the first remote memory is greater than or equal to the length of the memory required by the requesting node; and sending, to the requesting node and the target contributing node, information for the first remote memory to allow the requesting node to access the first remote memory provided by the target contributing node.

9. A control center in a memory management system, the control center comprising:

a memory comprising instructions; and one or more processors in communication with the memory, wherein the one or more processors execute the instructions to:

receive, from at least one contributing node, a start physical address and a length of remote memory provided by each of the at least one contributed node;

receive, from a requesting node, a length of memory required by the requesting node;

select a target contributing node from the at least one contributing nodes and determine a first remote memory provided by the target contributing node based on the length of memory required by the requesting node, and the start physical address and the length of the remote memory of the target contributing node, wherein the length of the first remote memory is greater than or equal to the length of the memory required by the requesting node; and send, to the requesting node and the target contributing node, information for the first remote memory to allow the requesting node to access the first remote memory provided by the target contributing node.

* * * * *